United States Patent
Okazaki et al.

(10) Patent No.: US 6,194,996 B1
(45) Date of Patent: Feb. 27, 2001

(54) INFORMATION TRANSFER VIA POWER LINE CARRIER

(75) Inventors: Hideaki Okazaki, Motosu-Gun; Mitsusato Kawashima, Ogaki, both of (JP)

(73) Assignee: IBIDEN Industries Co., Ltd., Ogaki (JP)

( * ) Notice: Subject to any disclaimer, the term of this patent is extended or adjusted under 35 U.S.C. 154(b) by 0 days.

(21) Appl. No.: 09/088,360

(22) Filed: Jun. 2, 1998

(30) Foreign Application Priority Data

Sep. 13, 1997 (JP) .................................................. 9-267760

(51) Int. Cl.[7] .................................................. H04M 11/04
(52) U.S. Cl. .............................. 340/310.01; 340/310.02; 307/105; 364/481
(58) Field of Search ...................... 340/310.01, 310.02; 371/48; 364/480, 481, 483; 363/39, 40, 59, 60; 307/105

(56) References Cited

U.S. PATENT DOCUMENTS

| | | | |
|---|---|---|---|
| 4,804,938 | * 2/1989 | Rouse et al. ................ | 340/310 A |
| 4,811,236 | * 3/1989 | Brennen et al. .................... | 364/483 |
| 5,351,180 | * 9/1994 | Brennen et al. ...................... | 363/71 |
| 5,355,025 | * 10/1994 | Moran et al. ....................... | 307/105 |
| 5,357,541 | * 10/1994 | Cowart .................................. | 375/1 |
| 5,561,597 | * 10/1996 | Limpaecher ........................... | 363/59 |
| 5,809,045 | * 9/1998 | Adamiak et al. ..................... | 371/48 |

* cited by examiner

Primary Examiner—Edward Lefkowitz
Assistant Examiner—Davetta Goins
(74) Attorney, Agent, or Firm—Pillsbury Madison & Sutro LLP

(57) ABSTRACT

A signal superposing apparatus designed, in accordance with a basic power line model taking account of the term of the mutual inductance and that of a self inductance of a transformer connected to AC power lines, with the circuit constants of capacitors selected appropriately to minimize the distortion of information waveform by the effect of the impedance of the transformer, will permit any desired waveform to be superposed over power signals with its distortion being kept to the minimum. In this way, for example a stepwise pulse waveform can be superposed over power signals with the distortion of waveform being minimized, and accordingly CDMA is made possible in a power line carrier system whereby information signals are communicated with power signals on AC power lines being used as carrier wave.

11 Claims, 27 Drawing Sheets

WAVEFORM OF VOLTAGE ACROSS C1
(SQUARE:V$_A$=8[v], fs=120[kHz])

WAVEFORM OF VOLTAGE ACROSS C2

WAVEFORM OF TRANSMITTED SIGNAL OVER
POWER LINE ACROSS C1 (30 [m] CORD LENGTH)
BY USING CDMA PATTERN "0"

WAVEFORM OF TRANSMITTED SIGNAL OVER
POWER LINE ACROSS C1 (90 [m] CORD LENGTH)
BY USING CDMA PATTERN "0"

WAVEFORM OF TRANSMITTED SIGNAL OVER INDOOR POWER
(A: SIGNAL SOURCE AFTER PUSH-PULL CIRCUIT ($V_A=8[v]$, $fs=120[kHz]$))
(B:TRANSMITTED SIGNAL OVER INDOOR POWER LINE OF WHICH
CORD LENGTH IS 30[m])

INFORMATION TRANSFER VIA POWER LINE CARRIER

FIELD OF THE INVENTION

The present invention relates to a transfer apparatus and a transfer method, using power lines for separating waveform signals (information signals) from waveform signals superposed over sine wave signals (carrier wave signals), also relates to a signal superposing apparatus and a signal superposing method for use in a power line carrier system for communicating information signals using power signals on AC power lines as carrier wave, and more particularly to a transfer apparatus and a transfer method using power lines effective in code division multiple access (CDMA).

BACKGROUND OF THE INVENTION

In a power line carrier system or the like, with sine wave power signals being used as carrier wave, information signals are superposed over the power signals and sent out. At the receiving end, the information signals superposed over the power signals are separated with a filter or the like. In separating information signals from electric signals in this process, though the phase of separated signals varies with the characteristics of the filter, it poses no essential problem when the information signals are analog audio signals or the like.

Now, when a digital signal is sent by the power line carrier system, the phase of the digital signal will be shifted at the receiving end, and the waveform will be distorted on the time axis. Where pulse signals are to be sent by pulse code modulation (PCM), even if the waveform is distorted on the time axis, such distortion can be coped with by newly generating pulse signals at the receiving end.

However, where signals undergo spread spectrum multiplexing, no pulse signals can be newly generated at the receiving end unlike in a PCM system. This waveform distortion on the time axis in signal reception poses a grave problem in the spread spectrum system.

Furthermore, one of the known power line carrier systems is to superpose information signals over a carrier wave consisting of sine wave power signals on AC power lines, and this is used in relatively simple communication of control signals, such as on-off control of a motor or the like, and of audio and other analog signals or digital signals by a PCM system. Many of the signal superposing systems used therein have a coupling transformer between the superposing system and the AC power lines to superpose information signals over power signals. As a result, the phase and other aspects of the information signals are varied by a kind of filter formed by this coupling transformer and the AC power lines, and this is known to invite waveform distortion of the superposed information signals.

However, even though information signals are subjected to such waveform distortion, no essential trouble would occur to control signals or analog signals referred to above because of the character of their processing. Nor would digital signals in a PCM system be subject to so serious disturbance, thanks to signal regeneration or otherwise at the receiving end, that signal errors are uncorrectable. Therefore, they created no system problem.

On the other hand, the progress of multiple access technology in recent years has led to studies on various multiplexing systems, and particular interest is focused on CDMA by spread spectrum multiplexing, which permits multiplexing with a simpler configuration than frequency division multiplexing or time division multiplexing.

However, if it is attempted to communication such CDMA-multiplexed information signals by the above-mentioned power line carrier system, inverse spreading on the receiving side is made difficult by the waveform distortion of signals, which are thereby prevented from demodulation. In other words, as it is impossible, in a power line carrier system using power signals on AC power lines as carrier wave over which information signals are superposed, to superpose information signals of a desired waveform (e.g. a stepwise waveform as illustrated in FIG. 20) without distortion, it is impossible to accomplish communications by CDMA.

An object of the present invention, undertaken to solve the problem pointed out above, is to provide a transfer apparatus and a transfer method, using power lines, for separating waveform information signals, on the time axis without distorting their waveform, from synthesized signals formed by superposing any desired waveform signals over sine wave signals.

Another object of the invention is to provide a transfer apparatus and a transfer method, using power lines, permitting superposition of information signals of a desired waveform over power signals on AC power lines.

SUMMARY OF THE INVENTION

According to the present invention, there is provided a transfer apparatus comprising:

a filter for extracting sine wave signals from sine wave signals over which waveform signals are superposed;

phase shifting means for giving a phase shift to the sine wave signals extracted by the filter;

phase converting means for generating sine wave signals before the superposition of the waveform signals by adding sine wave signals extracted by the filter and sine wave signals to which a phase shift has been given by the phase shifting means; and subtracting means for extracting waveform signals by subtracting the sine wave signals generated by the phase converting means from the sine wave signals over which the waveform signals are superposed.

According to the invention, there is provided a transfer method whereby sine wave signals are extracted from sine wave signals over which waveform signals are superposed; a phase shift is given to the extracted sine wave signals; sine wave signals before the superposition of the waveform signals are generated by adding sine wave signals extracted with the filter and sine wave signals to which a phase shift has been given; and waveform signals are extracted by subtracting the generated sine wave signals from the sine wave signals over which the waveform signals are superposed. Since waveform signals are extracted by generating sine wave signals having no phase shift from the original sine wave signals, the waveform signals can be extracted with no distortion on the time axis.

A preferred embodiment of the invention can be simply configured because the phase shifting means consists of either a differentiating circuit or an integrating circuit.

A transfer apparatus using a power line according to the invention is a signal superposing apparatus for superposing information signals over power signals on AC power lines, characteristic in that it has circuit elements obtained by using a self inductance and the mutual inductance of a transformer connected to the AC power line.

Another method according to the invention is a signal superposing method for superposing information signals over power signals on AC power lines whereby the information signals are given to the secondary the current i1 of a transformer, of which the primary side voltage e0 is represented by an expression including a term of L1(di0/dt) and a term of M(di1/dt) and the secondary side voltage e1 is represented by an expression including a term of M(di0/dt) and a term of L2(di1/dt) wherein:

L1 is the primary side self inductance of the transformer connected to the AC power line; L2, the secondary side self inductance of the transformer; M, the mutual inductance of the transformer; e0, the primary side voltage of the transformer; e1, the secondary side voltage of the transformer; i0, the primary side current of the transformer; and i1, the secondary side current of the transformer.

The invention involves circuit elements obtained by using a self inductance and the mutual inductance of a transformer connected to AC power lines. Thus the circuit configuration can take account of the impedance of this transformer.

In a preferred embodiment of the invention, the circuit elements consist of an impedance Z1 and an impedance Z2 connected between AC power lines so as to divide a power signal voltage, and a voltage source connected between the point of voltage division by the impedances Z1 and Z2 and either of the AC power lines. That is, the circuit elements consist of the impedances Z1 and Z2 for dividing the power signal voltage and the voltage source connected to the point of this voltage division.

In another preferred embodiment of the invention, as the impedance Z1 and the impedance Z2 consist of a capacitor each, even if information signals are supplied as voltage, the information signals are converted into current signals by these capacitors.

In still another embodiment of the invention, since a voltage source as illustrated in FIG. 20 and FIG. 23 has a function to generate information signals CDMA, information signals generated from the voltage source are multiplexed by CDMA.

According to the invention, when the secondary side voltage e1 is represented by an expression including a term of M(di0/dt) and a term of L2(di1/dt), information signals are given to the secondary side current i1 of the transformer. That is, with the secondary side self inductance L2 and the mutual inductance M of the transformer being taken account of, information signals are given to the secondary side current i1 of the transformer.

DESCRIPTION OF THE PREFERRED EMBODIMENTS

Preferred embodiments of a separating unit for waveform signals superposed over sine wave signals according to the present invention will be described below with reference to accompanying drawings.

Figure 1:
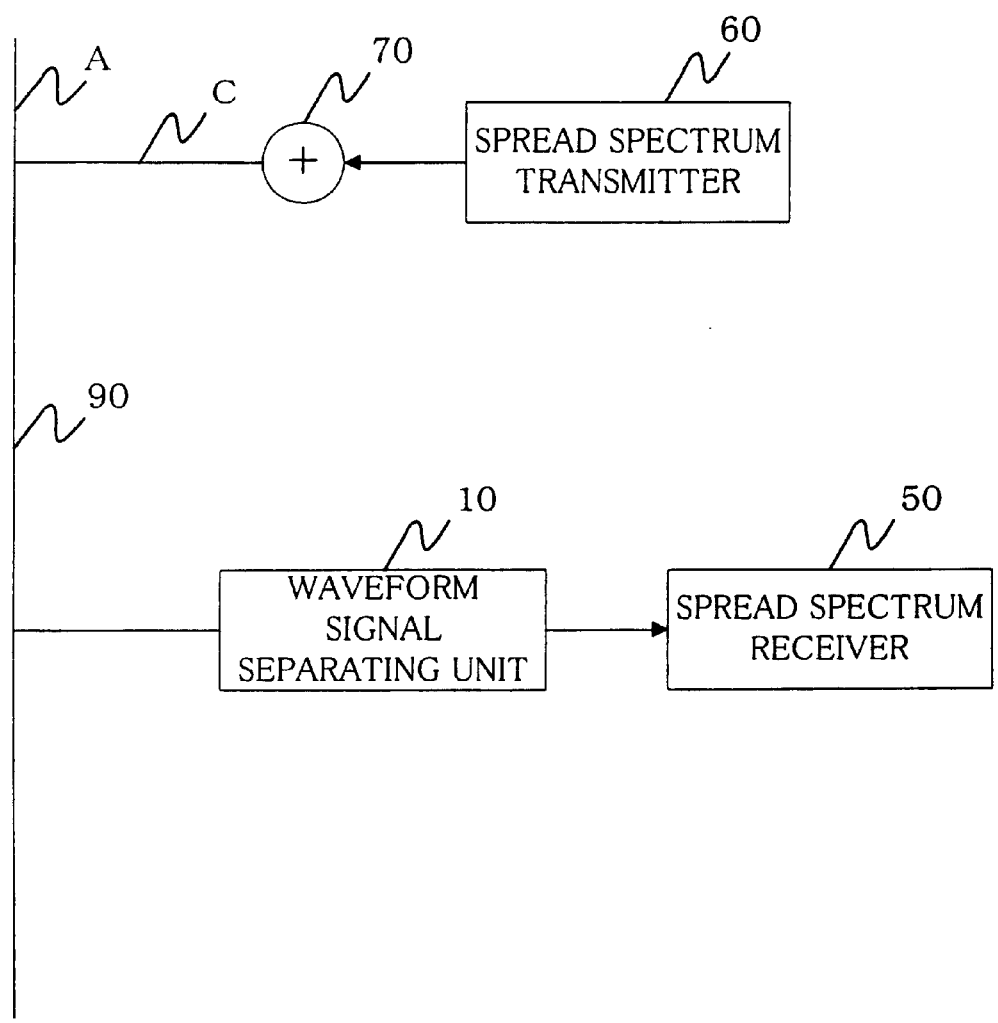
FIG. 1 is a schematic diagram illustrating a communication system pertaining to a first preferred embodiment of the present invention.

FIG. 1 is a schematic diagram illustrating a power line communication system using a waveform signal separating unit pertaining to a first preferred embodiment of the present invention.

Waveform information from a spread spectrum transmitter 60 is superposed by an adder 70 over sine wave power signals on power lines 90. A waveform signal separating unit 10 separates the waveform information superposed over the sine wave signals on the power lines 90, and sends it toward a spread spectrum receiver 50.

The configuration of this waveform signal separating unit 10 will now be described with reference to FIG. 2.

Here, a signal resulting from the superposition of an information signal over a sine wave power signal by the adder 70, i.e. a signal to be carried over the power lines 90, can be expressed as A sin $(2\pi ft)$+H(t) wherein A sin $(2\pi ft)$ is the sine wave power signal on the power lines 90 and H(t) is the information signal from the spread spectrum transmitter 60 shown in FIG. 1.

A low-pass filter 12 having a filter operator of F(x) and an amplification factor of b turns the signal A sin $(2\pi ft)$+H(t) into bA sin $(2\pi ft+\phi)$. That is, it removes an information signal H(t), which is a high frequency component. At this step, amplification by an equivalent of b is accomplished, and at the same time the phase is advanced (or delayed) by an equivalent of $\phi$. Then an amplifier 14 of 1/b in amplification factor cancels the b equivalent of amplification by the low-pass filter 12, and outputs A sin $(2\pi ft+\phi)$.

A differentiator 16 having an operator of D(x) and an amplification factor of $2\pi fc$ shifts the phase of the entered signal A sin $(2\pi ft+\phi)$ by 90 degrees to turn it into $2\pi fc$A cos $(2\pi ft+\phi)$. Then an amplifier 18 having an amplification factor of $1/2\pi fc$ cancels an equivalent of $2\pi fc$ resulting from the amplification by the low-pass filter 12 and outputs A cos $(2\pi ft+\phi)$.

A phase converter 20 consisting of an amplifier 22, an adder 24 and another amplifier 26 generates from the aforementioned signal a sine wave power signal A sin $(2\pi ft)$ of the power lines 90. That is, the signal A sin $(2\pi ft+\phi)$ from the aforementioned amplifier 14 is amplified by the amplifier 26 having an amplification factor of cos-$\phi$ into A sin $(2\pi ft+\phi)$ (cos-$\phi$), which is fed to the adder 24. On the other hand, the signal A cos $(2\pi ft+\phi)$ from the aforementioned amplifier 18 is amplified by the amplifier 22 having an amplification factor of sin-$\phi$ into A cos $(2\pi ft+\phi)$ (sin-$\phi$), which is fed to the adder 24. The adder 24 outputs by the addition theorem a sine wave signal A sin $(2\pi ft)$ by adding the signal A sin $(2\pi ft+\phi)$ (cos-$\phi$) and the signal A cos $(2\pi ft+\phi)$ (sin-$\phi$).

A subtracter 30 extracts the information signal H (t) of the spread spectrum transmitter 60 by subtracting the sine wave signal A sin $(2\pi ft)$ supplied by the phase converter 20 from the signal A sin $(2\pi ft+\phi)$+H(t) carried over the power lines 90. Since there is no phase shift between the sine wave signal A sin $(2\pi ft)$ from the phase converter 20 and a carrier A sin $(2\pi ft)$ in the signal A sin 412 $(2\pi ft)$+H(t) carried over the power lines 90, the information signal H(t) can be extracted on the time axis with no distortion whatsoever. Incidentally, while the signal having passed the low-pass filter 12 is given a 90 degree shift by the differentiator 16 in the above-described example, it is also possible to use an integrator to give the 90 degree shift.

Now, the result of an experiment of signal processing by the waveform signal separating unit 10 will be described with reference to waveform diagrams of FIGS. 7 to 10.

Figure 7A:
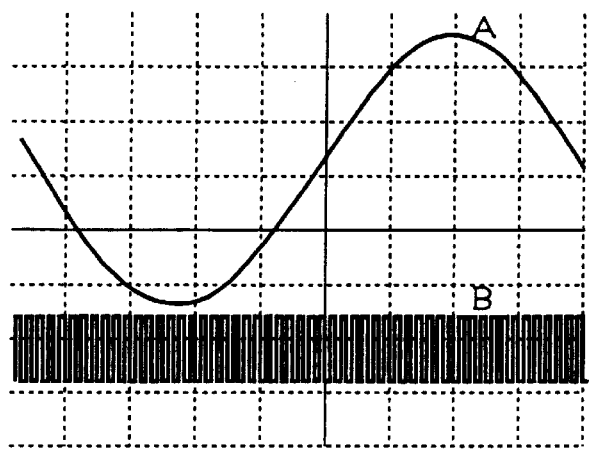
FIGS. 7(A), 7(B) and 7(C) are waveform diagrams in different parts of a communication system pertaining to the first preferred embodiment of the present invention.

FIG. 7(A) shows the sine wave power signal on the power lines 90 as waveform A and the information signal as waveform B. This waveform A is a commercial AC frequency of 60 Hz on the power lines 90 shown in FIG. 1, and a waveform B corresponds to the information signal from the spread spectrum transmitter 60 of FIG. 1.

Figure 7B:
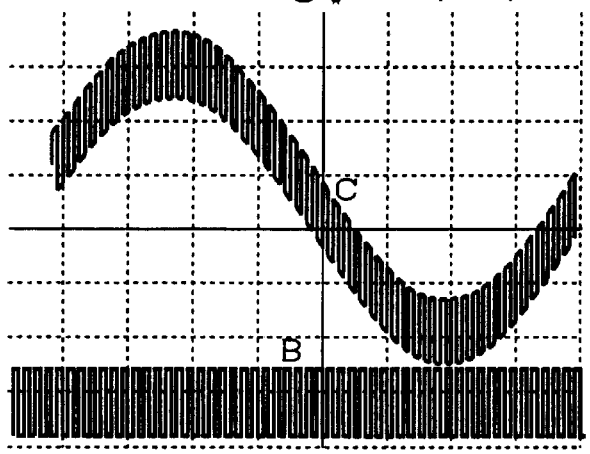
Figure 7C:
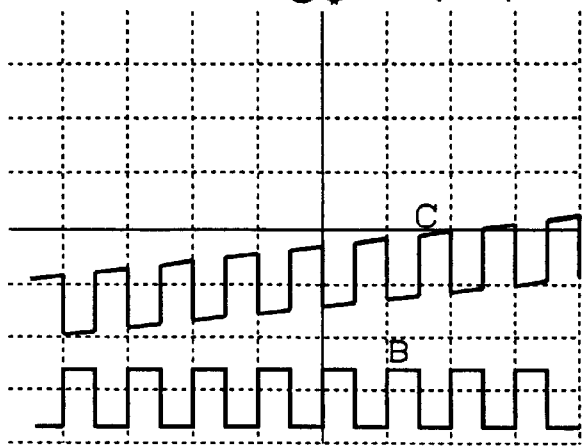

A waveform C shown in FIG. 7(B) is the waveform of a signal resulting from the superposition of an information signal B over sine wave power signal A shown in FIG. 7(A). FIG. 7(C) shows the waveform of FIG. 7(B) on an expanded scale. That is the waveform C is the waveform on the output side of the adder 70 in FIG. 1.

Figure 2:
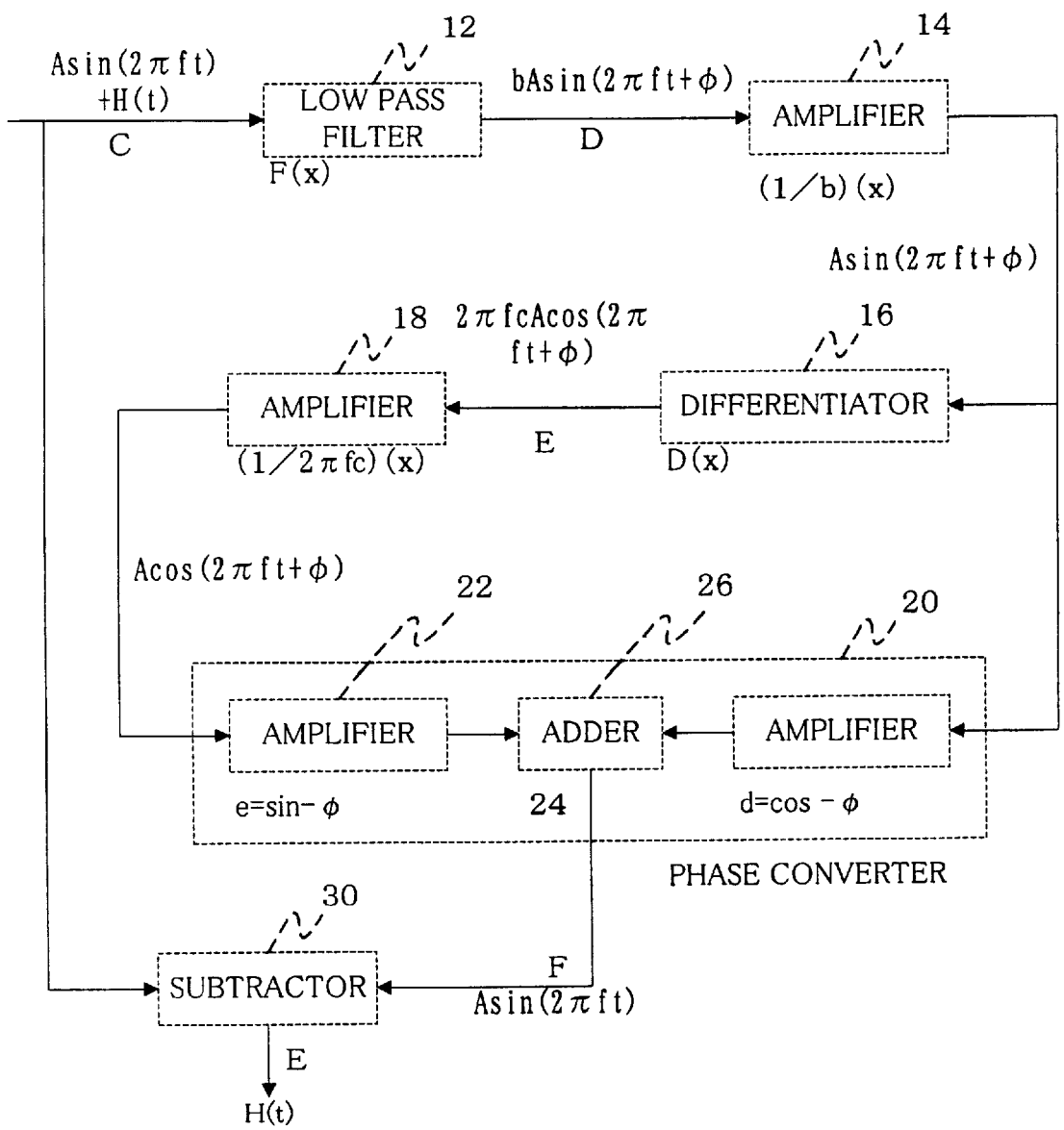
FIG. 2 is a block diagram of the waveform signal separating unit shown in FIG. 1.
Figure 8A:
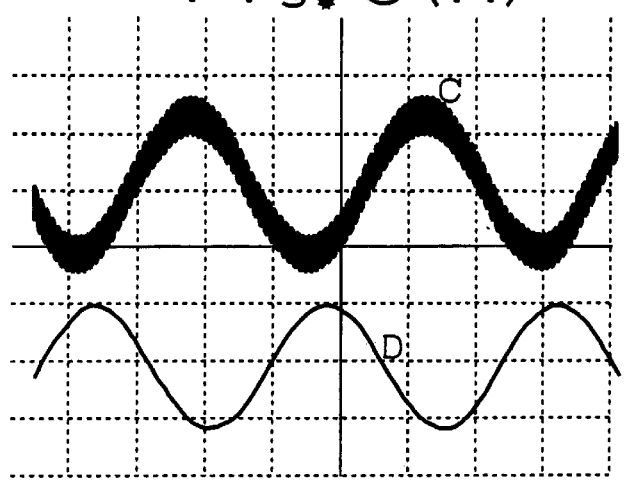
FIGS. 8(A), 8(B) and 8(C) are waveform diagrams in different parts of a communication system pertaining to the first preferred embodiment of the present invention.

A waveform D shown in FIG. 8(A) is the waveform of a signal having passed the low-pass filter 12 shown in FIG. 2. In FIG. 8(A), the waveform C before passing the low-pass filter 12 is also shown for the purpose of comparison. Although the information signal B is removed by the low-pass filter 12 as stated above, there is a phase shift.

Figure 8B:
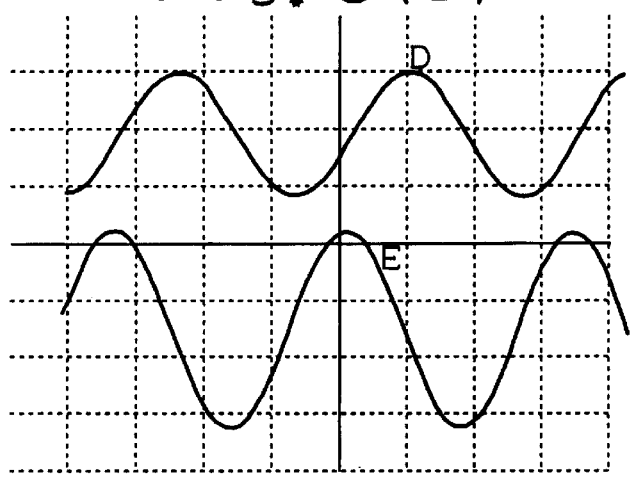

A waveform E shown in FIG. 8(B) is the waveform of a signal having passed the differentiator 16 shown in FIG. 2. In FIG. 8(B), the waveform D before passing the differentiator 16 is also shown for the purpose of comparison. As stated above, the phase is shifted by the differentiator 16 by 90 degrees.

Figure 8C:
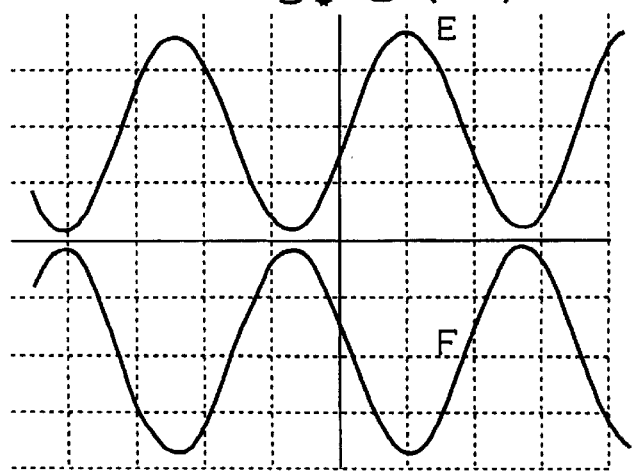

A waveform F shown in FIG. 8(C) is the waveform of a signal having passed the phase converter 20 shown in FIG. 2. In FIG. 8(C), the waveform E before passing the phase converter 20 is also shown for the purpose of comparison. As stated above, the phase is restored by the phase converter 20 to its original state before passing the low-pass filter 12.

Figure 9A:
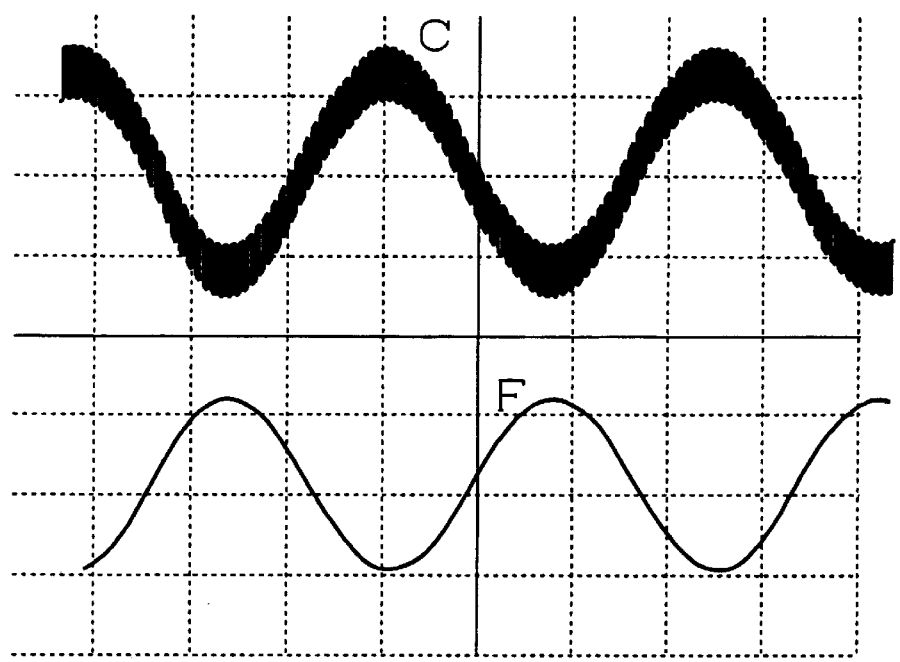
FIGS. 9(A) and 9(B) are waveform diagrams in different parts of a communication system pertaining to the first preferred embodiment of the present invention.
Figure 9B:
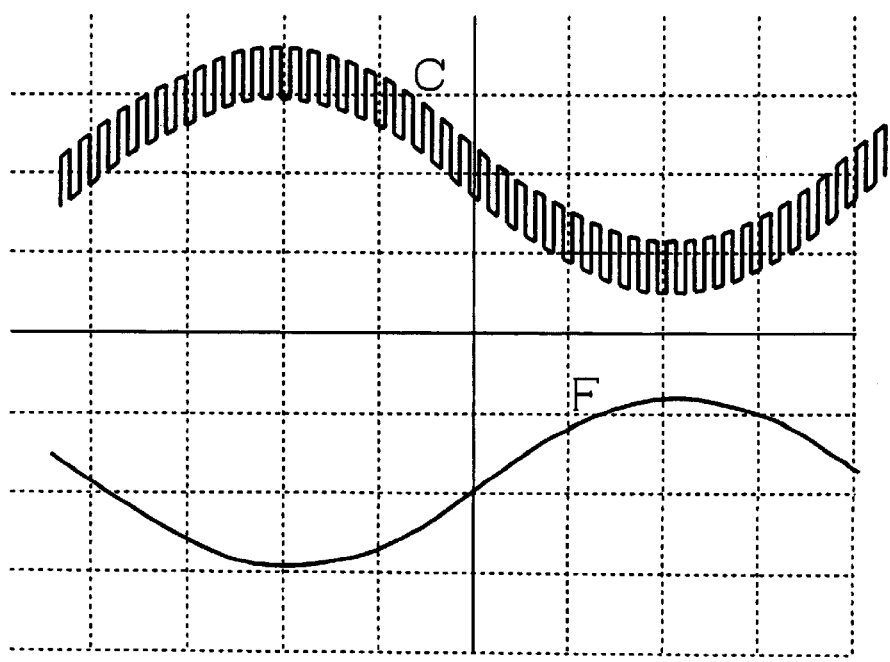

In FIG. 9(A), the waveform C of a signal resulting from the superposition of the information signal B over the sine wave power signal A shown in FIG. 8(A) and the waveform F of the aforementioned sine wave power signal whose original phase has been restored by the phase converter 20 shown in FIG. 8(C) are shown, and FIG. 9(B) shows the signal in FIG. 9(A) on an expanded scale. As is evident from the diagrams, there is no phase shift between the signal waveform C and the waveform F of the sine wave power signal whose original phase has been restored.

Figure 10A:
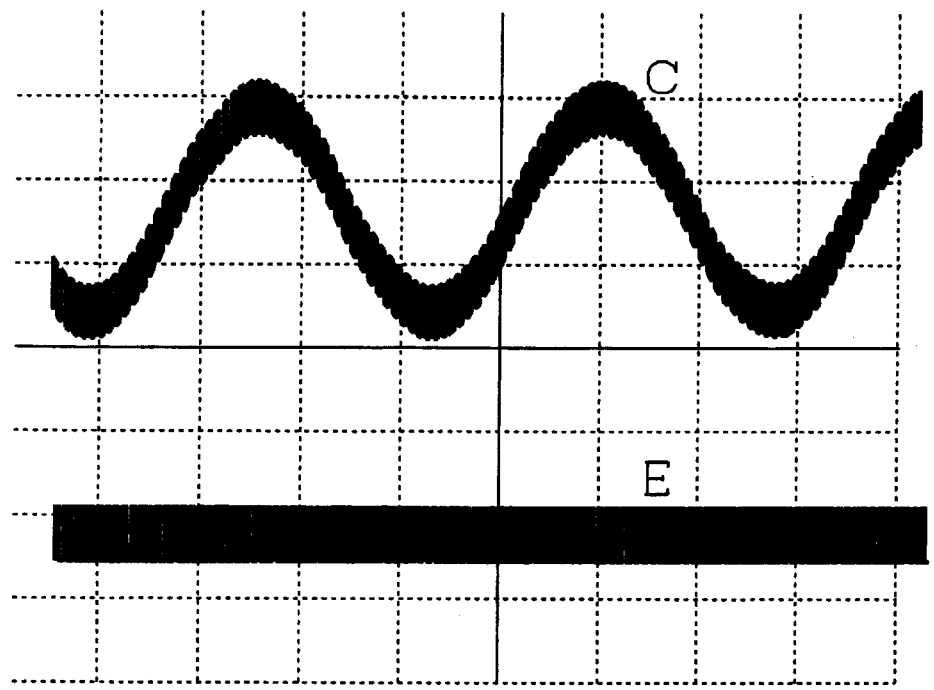
FIGS. 10(A) and 10(B) are waveform diagrams in different parts of a communication system pertaining to the first preferred embodiment of the present invention.
Figure 10B:
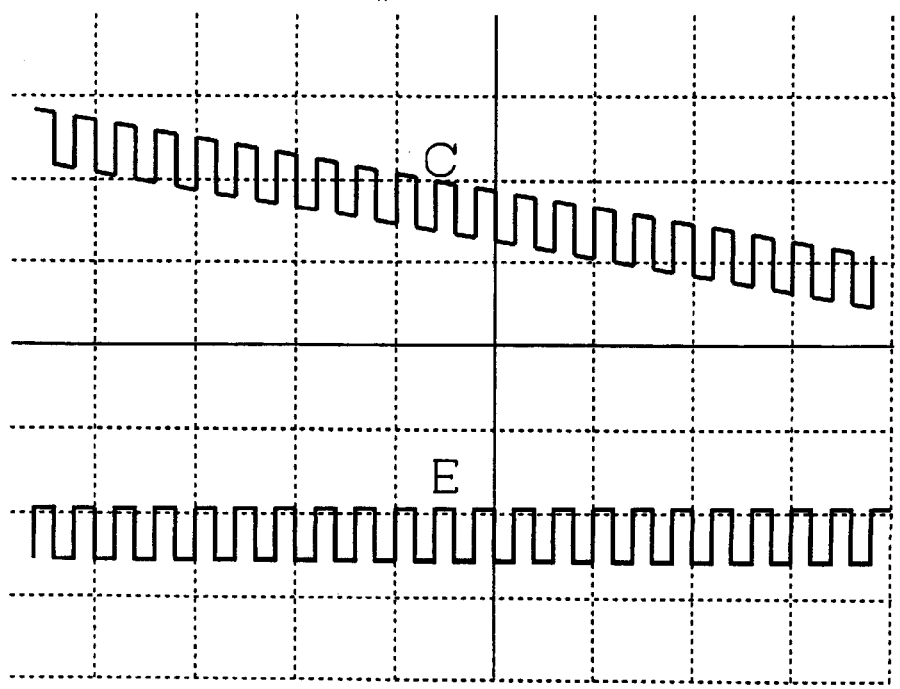

In FIG. 10(A), the waveform C of the signal resulting from the superposition of the information signal B over the sine wave power signal A shown in FIG. 8(A) and the waveform E of the information signal separated from the signal waveform C by the aforementioned subtracter 30 shown in FIG. 2 are shown, and FIG. 10(B) shows the signal in FIG. 10(A) on an expanded scale. As is evident from the diagrams, the waveform of the information signal E has no distortion compared with the original information signal B shown in FIG. 7(A). That is, the information signal H(t) is extracted on the time axis with no distortion whatsoever because it is separated by using a generated signal A sin $(2\pi ft)$ having no phase shift from the carrier A sin $(2\pi ft)$ in the carried signal A sin $(2\pi ft)$+H(t).

The waveform signal separating unit 10 described above with reference to FIG. 2 reproduces the original sine wave carrier signal by adding a sine wave carrier signal whose phase has been shifted by the low-pass filter 12 and a signal resulting from phase shifting of the sine wave carrier signal by 90 degrees. Here, the separating unit for waveform signals superposed over sine wave signals according to the present invention can regenerate the original sine wave carrier signal by giving any desired phase shift, not necessarily by 90 degrees. This configuration will be described below with reference to FIG. 3, which is a block diagram of the waveform signal separating unit.

In this modified version, a first linear filter 62 advances the phase of the information signal-superposed sine wave power signal A sin ($2\pi ft$)+H(t) by $\phi$ when the information signal H(t) is removed from it; a second linear filter 66 advances its phase by $\psi$; and a phase converter 80 generates a sine wave power signal A sin ($2\pi ft$).

This principle will be explained in more detail below.

Time: t
Phase advance by first linear filter operator: $\phi$
Phase advance by second linear filter operator: $\psi$
Amplification factors of first and second linear filter operators: b1, b2
First and second linear filter operators: F1(x), F2(x)
The phase advances and amplification factors of F1(x) and F2(x) are defined to be (b1, $\phi$) and (b2, $\psi$), respectively.
Amplification factor of indefinite integral operator: c1
Indefinite integral operator: (1/D) (x)
Amplification factor of differential operator: c2
Differential operator: D(x)
Amplification operators: (1/b)=x/b, (1/$2\pi fc$) (x)=x/$2\pi fc$, d(x)=d·x, e(x)=e·x
Sine wave information signal: A sin ($2\pi ft$)
Signal of any waveform having a basic frequency of fh: H(t)
Synthesized waveform information signal resulting from superposition of any waveform information signal: Defined to be A sin ($2\pi ft$)+H(t)
Where fh≠f holds, $$F1(A \sin (2\pi ft)+H(t))=1A \sin (2\pi ft+\phi)$$

$$F2(A \sin (2\pi ft)+H(t))=2A \sin (2\pi ft+\psi)$$

will also hold if suitable linear filters are used.
Incidentally, since (1/D) (A sin ($2\pi ft+\phi$))=−(c1/$2\pi f$)A cos($2\pi ft+\phi$)=(c1/$2\pi f$)+A sin ($2\pi ft+\phi-\pi/2$)

holds because of the indefinite integral operator, and

D(A sin ($2\pi ft+\phi$))=$2\pi fc2$A cos($2\pi ft+\phi$)=−$2\pi fc2$A cos ($2\pi ft+\phi-\pi/2$)

holds because of the differential operator, the indefinite integral operator and the differential operator act in the same way as the linear filter operator F2(x) on the sine wave information signal, they are also included in the linear filter operator F2(x).

By the addition theorem or rotational conversion of the sine wave, $$\begin{bmatrix} \cos(2\pi ft+\phi) \\ \sin(2\pi ft+\phi) \end{bmatrix} = \begin{bmatrix} \cos(\phi) & -\sin(\phi) \\ \sin(\phi) & \cos(\phi) \end{bmatrix}\begin{bmatrix} \cos(2\pi ft) \\ \sin(2\pi ft) \end{bmatrix}$$

$$\begin{bmatrix} \cos(2\pi ft+\psi) \\ \sin(2\pi ft+\psi) \end{bmatrix} = \begin{bmatrix} \cos(\psi) & -\sin(\psi) \\ \sin(\psi) & \cos(\psi) \end{bmatrix}\begin{bmatrix} \cos(2\pi ft) \\ \sin(2\pi ft) \end{bmatrix}$$

where sin ($2\pi ft+\phi$)=sin ($\phi$)·cos($2\pi ft$)+cos($\phi$)·sin ($2\pi ft$) sin ($2\pi ft+\psi$)=sin ($\psi$)·cos($2\pi ft$)+cos($\psi$)·sin ($2\pi ft$) hold, there will be $\phi$ and $\psi$ satisfying $$\begin{bmatrix} \cos(2\pi ft) \\ \sin(2\pi ft) \end{bmatrix} = \begin{bmatrix} \sin(\phi) & \cos(\phi) \\ \sin(\psi) & \cos(\psi) \end{bmatrix}^{-1}\begin{bmatrix} \sin(2\pi ft+\phi) \\ \sin(2\pi ft+\psi) \end{bmatrix}$$

$$= \frac{1}{\sin(\phi)\cos(\psi)-\sin(\psi)\cos(\phi)} \times \begin{bmatrix} \cos(\psi) & -\cos(\phi) \\ -\sin(\psi) & \sin(\phi) \end{bmatrix}$$

$$\begin{bmatrix} \sin(2\pi ft+\phi) \\ \sin(2\pi ft+\psi) \end{bmatrix}$$

$$= \frac{1}{\sin(\phi-\psi)} \times \begin{bmatrix} \cos(\psi) & -\cos(\phi) \\ -\sin(\psi) & \sin(\phi) \end{bmatrix}\begin{bmatrix} \sin(2\pi ft+\phi) \\ \sin(2\pi ft+\psi) \end{bmatrix}$$

so that such amplification operators as sin ($2\pi ft$)=d·sin ($2\pi ft+\phi$)+e·sin ($2\pi ft+\psi$) where d=−sin ($\psi$)/sin ($\phi-\psi$) e=sin ($\phi$)/sin ($\phi-\psi$) can be defined.

Therefore, if the following information signal processing system is constructed from the operators given above, the following equation will hold:

H(t)=A sin ($2\pi ft$)+H(t)−[d·F1(A sin ($2\pi ft$)+H(t))+e·F2(A sin ($2\pi ft$))+H(t))]

Figure 3:
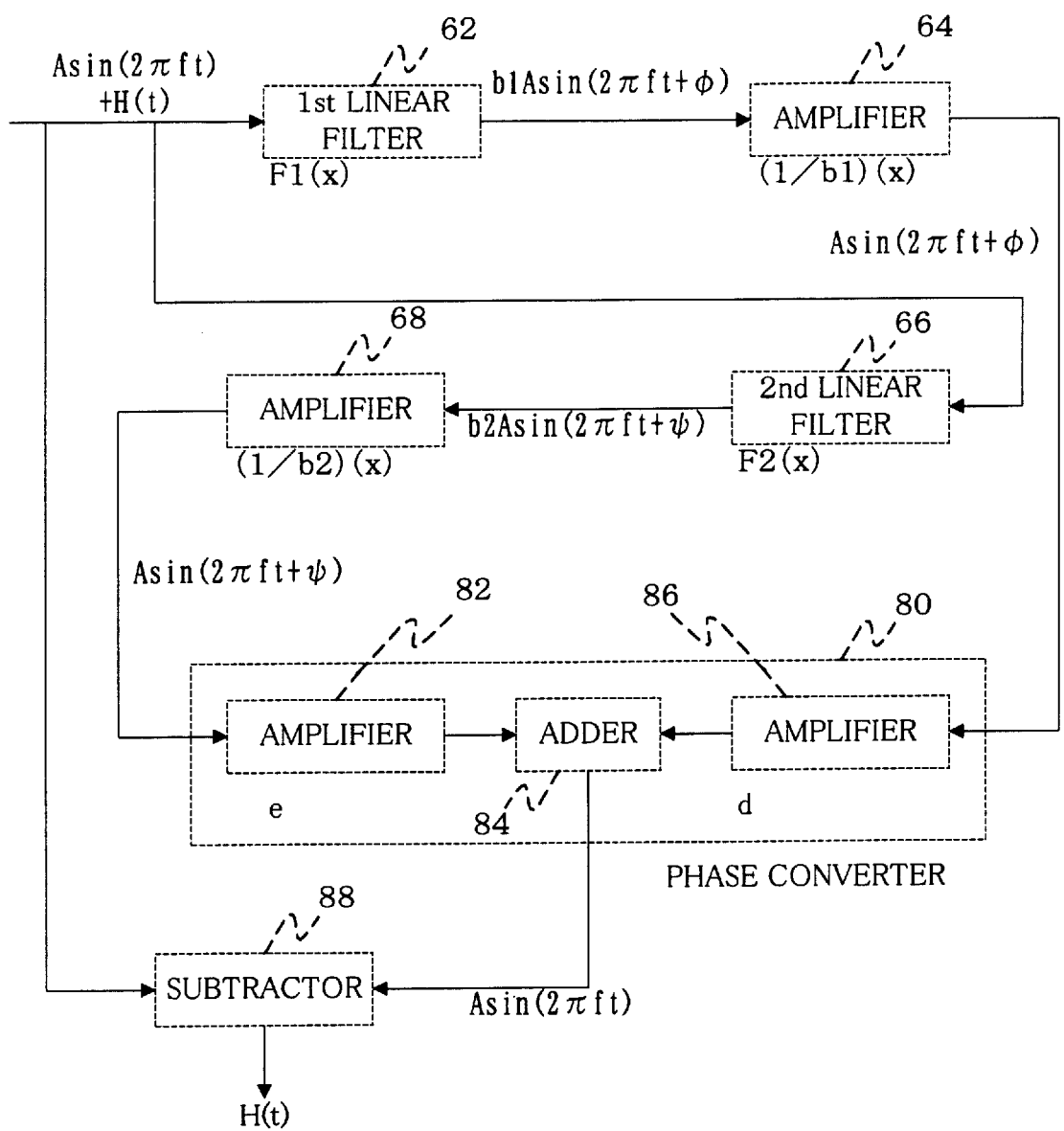
FIG. 3 is a block diagram of another version of the waveform signal separating unit shown in FIG. 1.

Like the waveform signal separating unit described with reference to FIG. 2, the phase converter 80 consisting of an amplifier 82, an adder 84 and another amplifier 86 as illustrated in FIG. 3 generates from the aforementioned signals the sine wave power signal A sin ($2\pi ft$) on the power lines 90. That is, the signal A sin ($2\pi ft+\psi$) from the aforementioned amplifier 68 is fed to the adder 84 via the amplifier 82 having an amplification factor of e satisfying the above-stated condition. On the other hand, the signal A sin ($2\pi ft+\phi$) from the aforementioned amplifier 64 is supplied to the adder 84 via the amplifier 86 having an amplification factor of d satisfying the above-stated condition. The adder 84 outputs by the addition theorem and rotational theorem the sine wave signal A sin ($2\pi ft$) by adding the two signals.

A subtracter 88 extracts the information signal H(t) of the spread spectrum transmitter 60 by subtracting the sine wave signal A sin ($2\pi ft$) supplied by the phase converter 80 from the signal A sin ($2\pi ft$)+H(t) carried over the power lines 90. Since there is no phase shift between the sine wave signal A sin ($2\pi ft$) from the phase converter 80 and the carrier A sin ($2\pi ft$) in the signal A sin ($2\pi ft$)+H(t) carried over the power lines 90, the information signal H(t) can be extracted on the time axis with no distortion whatsoever.

To follow up, another mode of implementation of the first preferred embodiment will be described with reference to FIGS. 4 and 5.

Figure 4:
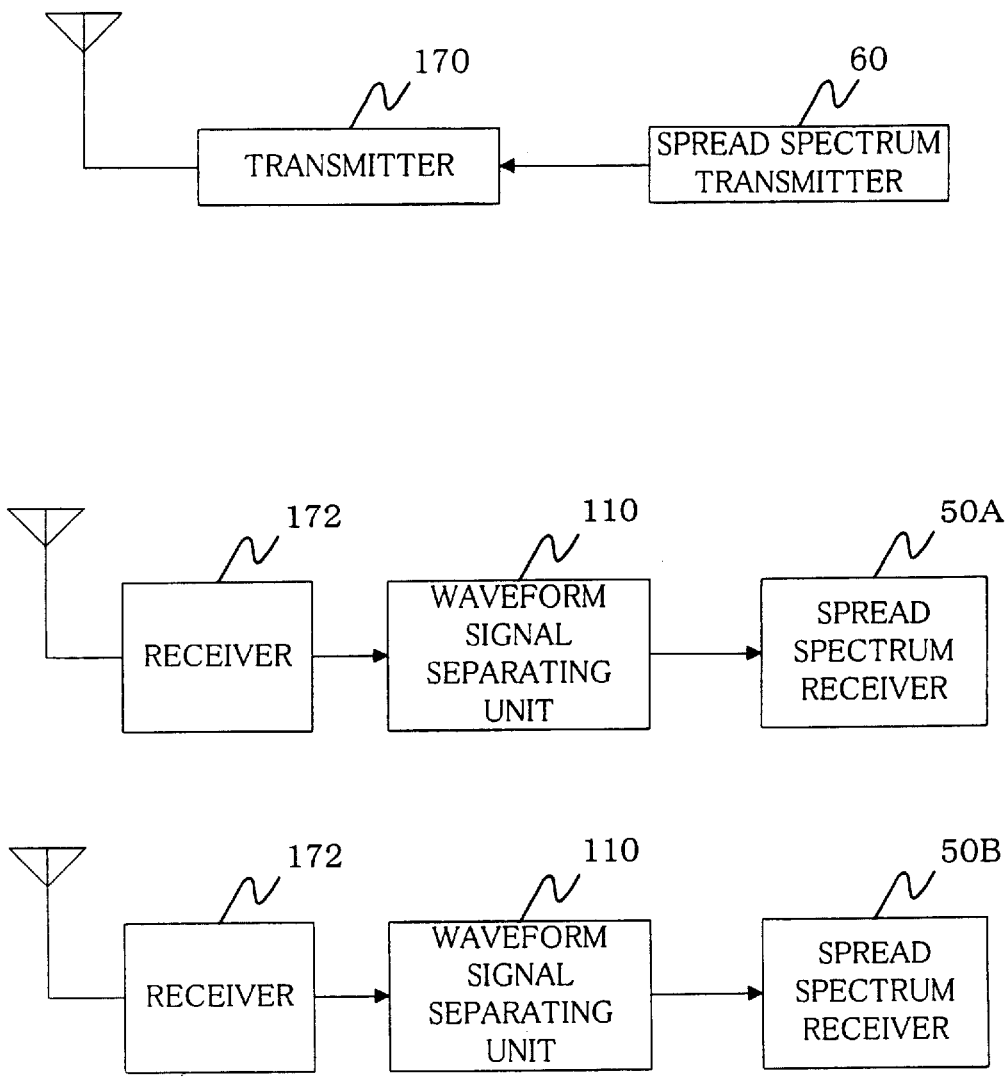
FIG. 4 is a schematic diagram illustrating a communication system pertaining to the first preferred embodiment of the present invention in another mode of implementation.
Figure 5:
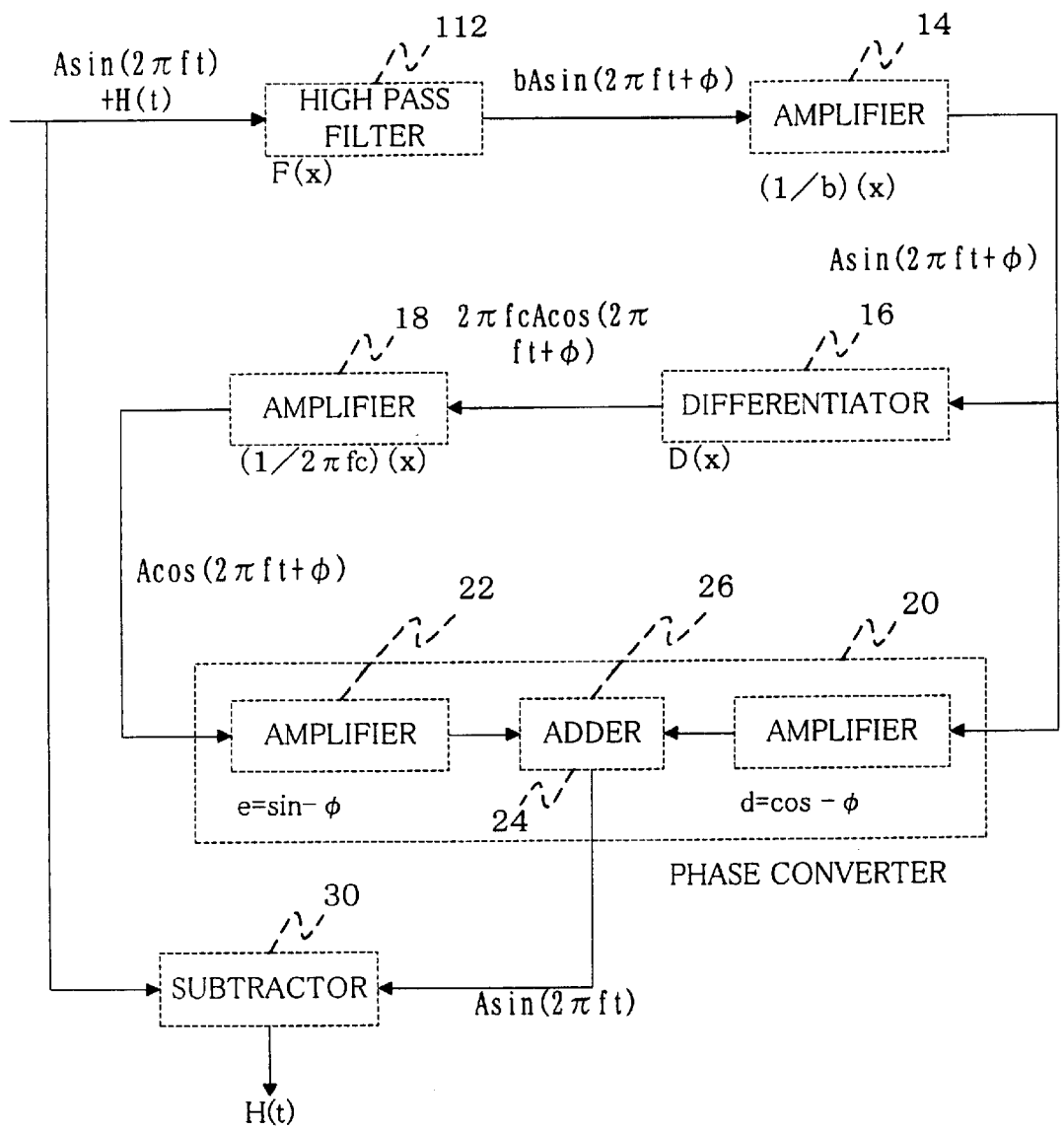
FIG. 5 is a block diagram of the waveform signal separating unit shown in FIG. 4.

FIG. 4 is a schematic diagram illustrating a communication system pertaining to the first embodiment of the invention in that other mode of implementation.

Waveform information multiplexed by the spread spectrum transmitter 60 is superposed by a transmitter 170 over the high frequency sine wave carrier signals and sent out as an electric wave. A receiver 172 receives the electric wave sent by the transmitter, and supplies it toward a waveform signal separating unit 110. The waveform signal separating unit 110 separates the waveform information superposed over the sine wave carrier signals, and sends it toward spread spectrum receivers 50A and 50B. Incidentally in this second preferred embodiment, the spread spectrum transmitter 60 multiplexes information and send it out to the spread spectrum receivers 50A and 50B, and the spread spectrum receivers 50A and 50B, after receiving the information, separate the multiplexed information.

The configuration of this waveform separating unit 110 will be described with reference to FIG. 5.

Here the signals to be carried by radio is represented by A sin (2πft)+H(t), wherein A sin (2πft) is the sine wave carrier signal and H(t), the information signal of the spread spectrum transmitter 60 shown in FIG. 4.

A high-pass filter 112 turns the signal A sin (2πft)+H(t) into bA sin (2πft+φ). Namely, the information signal H(t), which is a low frequency component, is removed. A description of the following actions is dispensed with here because they are the same as in the mode of implementation described with reference to FIG. 2.

Next will be described still another mode of implementation pertaining to the first preferred embodiment with reference to FIG. 6.

Figure 6:
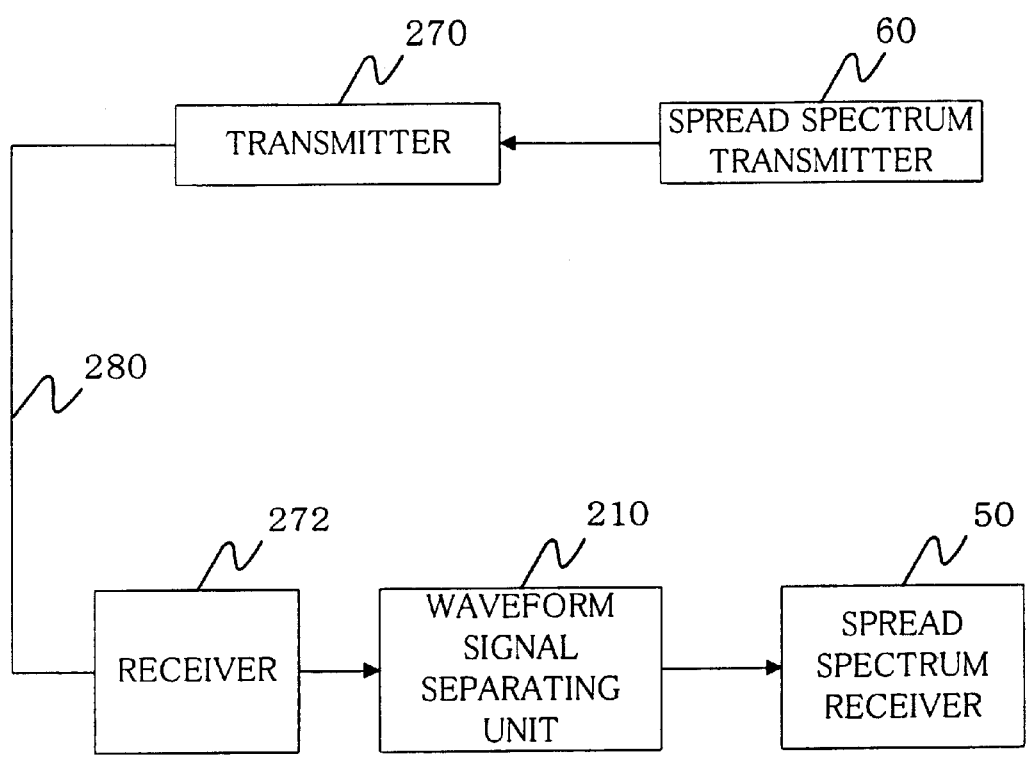
FIG. 6 is a schematic diagram illustrating a communication system pertaining to the first preferred embodiment of the present invention in still another mode of implementation.

FIG. 6 illustrates an optical communication system using a waveform signal separating unit according to still another mode of implementation pertaining to the first embodiment of the invention.

Waveform information multiplexed by the spread spectrum transmitter 60 is superposed by a transmitter 270 over high frequency sine wave carrier signals and sent out to an optical fiber 280 as optical signals. A receiver 272 receives the optical signals sent from the transmitter, and supplies them toward a waveform signal separating unit 210, which then separates the waveform information superposed over the sine wave carrier signals, and sends the separate information toward the spread spectrum receiver 50. Incidentally, a description of this waveform signal separating unit 210 in this alternative version of embodiment is dispensed with because it is the same as the aforementioned version described with reference to FIG. 5.

In the first embodiment of the present invention, sine wave signals are extracted from waveform signals-superposed sine wave signals by a filter; a phase shift is given to the extracted sine waves; and the filter-extracted sine wave signals and the phase-shifted sine wave signals are added together to generate the original sine wave signals before the superposition of the waveform signals. The waveform signals are extracted by subtracting the sine wave signals so generated from the waveform signals-superposed sine wave signals. As the sine wave signals having no phase shift from the original sine wave signals are generated to take out the waveform signals, and therefore the waveform signals can be extracted free from distortion on the time axis, this apparatus can be appropriately used for regenerating transmitted signals in spread spectrum communication.

Next will be described a signal superposing apparatus and a signal superposing method in a second preferred mode of implementation of the present invention with reference to FIGS. 11 to 23.

Figure 12:
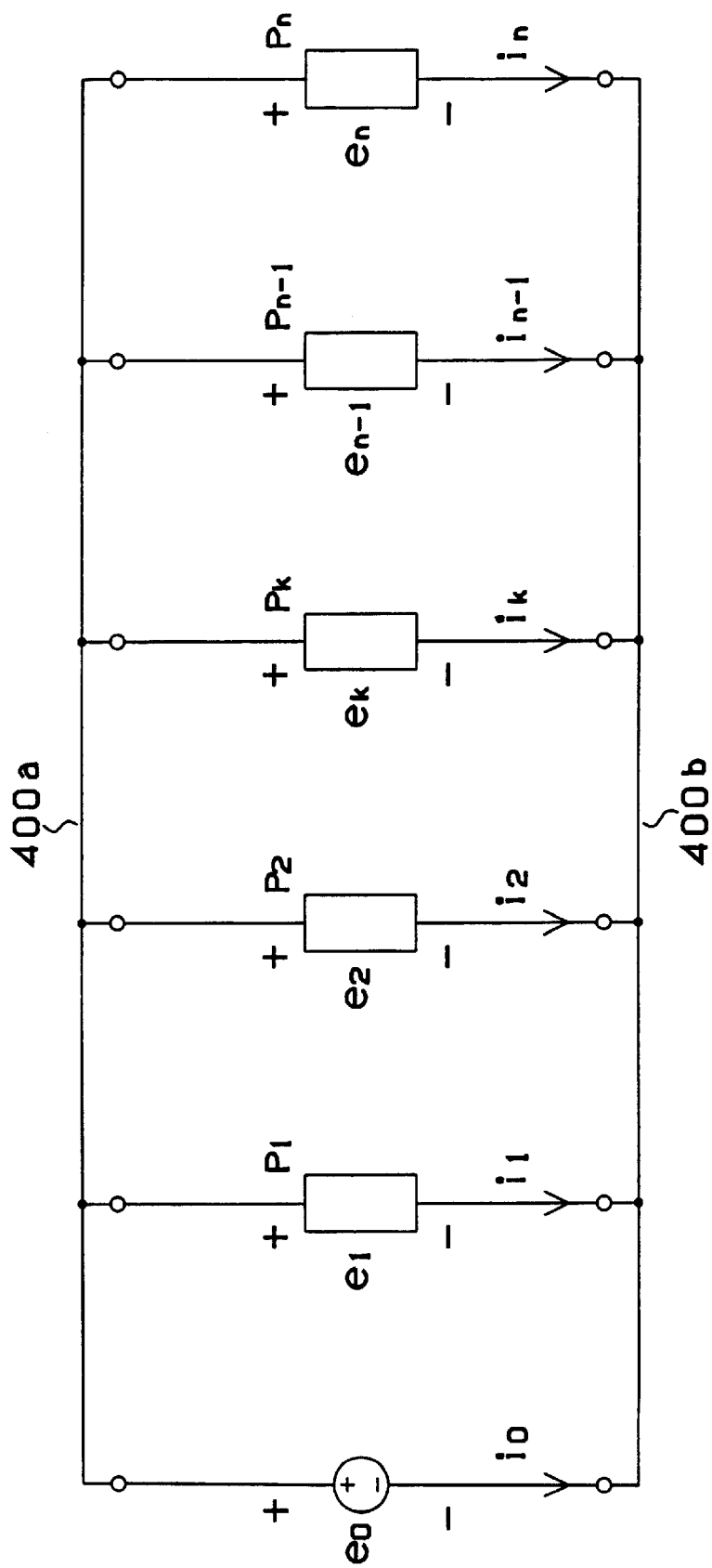
FIG. 12 is a circuit diagram illustrating a basic model of ideal power lines.

First, with a view to making clear characteristics of communication by a power line carrier system, the character of the basic power line model given in FIG. 12 will be explained. In FIG. 12, e1, e2, ek, en-1 and en respectively denote voltages between terminals P1, P2, Pk, Pn-1 and Pn connected between AC power lines 400a and 400b, and i1, i2, ik, in-1 and in represent currents between these terminals P1, P2, Pk, Pn-1 and Pn. Further, e0 stands for an ideal sine wave power supply having an amplitude of A and a frequency of f, given by an equation of e0=A sin (2πft).

As shown in FIG. 12, e0, P1, P2, . . . , Pn-1 and Pn are connected in parallel, and the condition of their connection is e0=e1=e2=, . . . , =en and i0+i1+i2+, . . . , in 32 0. Therefore it is seen that any attempt to give an arbitrary ideal power supply e(t) to terminals Pn would be prohibited by Kirchhoff's law. Namely, as is seen from FIG. 12 illustrating a momentary state of potential of the ideal sine wave voltage supply e0 varying in an amplitude of A and a frequency of f, as long as e0 is the ideal voltage supply, the voltage across every terminal Pn is e0=e1=e2=, . . . , =en, so that no arbitrary ideal power supply e(t) can be given to terminals Pn.

Figure 13:
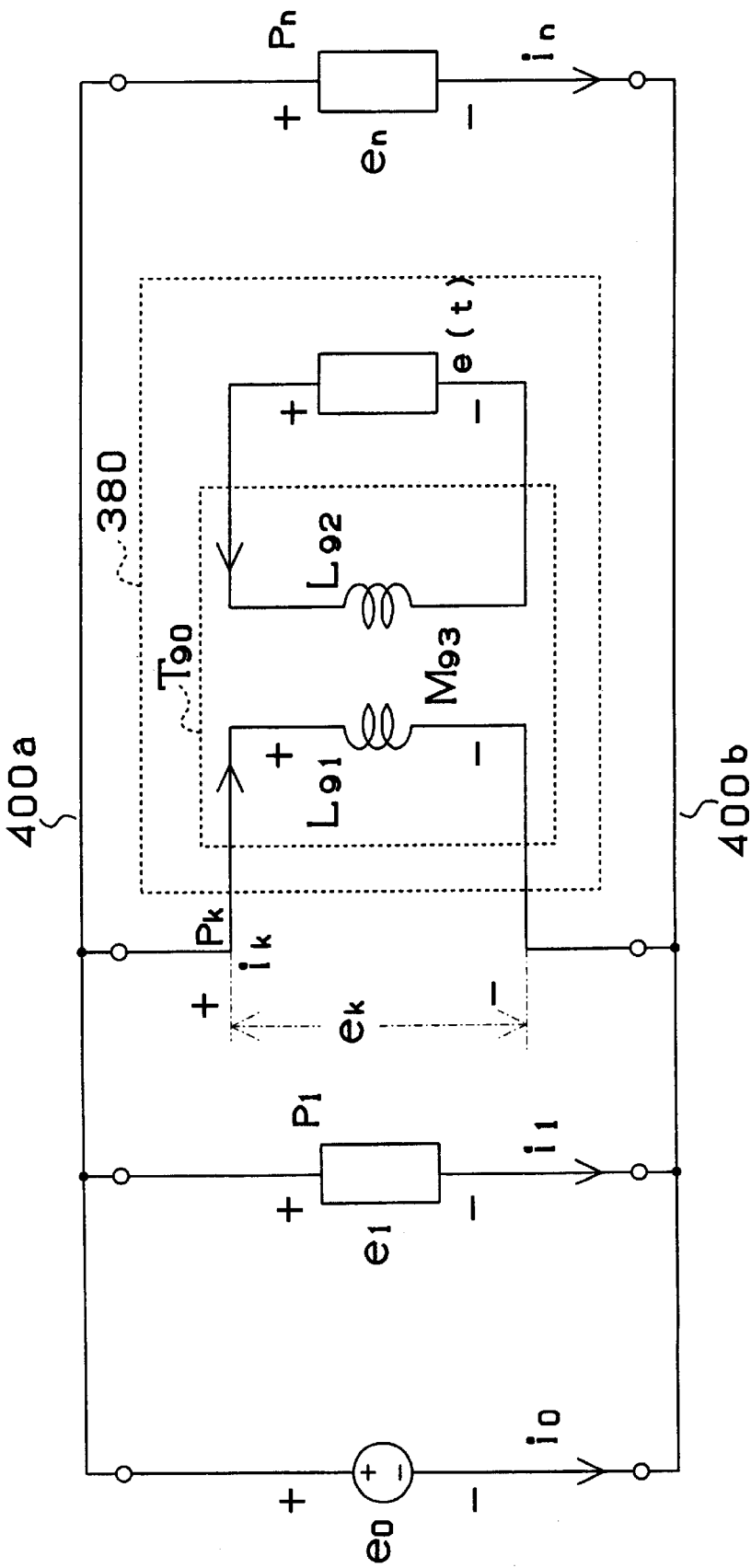
FIG. 13 is a circuit diagram illustrating a basic model in which a coupling transformer intervenes between and is connected to AC power lines.

This character also holds true with a signal superposing apparatus 380 according to the prior art in a power line carrier system illustrated in FIG. 13.

As shown in FIG. 13, the prior art signal superposing apparatus 380 has a configuration involving a coupling transformer T90 intervening between AC power lines 400a and 400b, and an information signal generator e(t) is connected to terminal Pk. Since Kirchhoff's law prevents ek (k 0 ) from being the sum of e0 and e(t) as long as e0 is the ideal voltage supply as stated above, information signals given from terminal Pk cannot be superposed over power signals in this configuration of basic power line model. Therefore it is found that communications by a power line carrier system using the prior art signal superposing apparatus 380 cannot be valid unconditionally.

Thus, in order for this prior art communication system to be valid, no simple parallel connection would suffice, but there should be some elements present between sine wave power signals e0 supplied from a power company or the like and indoor wiring, i.e. AC power lines, in the building or the like to which the power is supplied.

Figure 14:
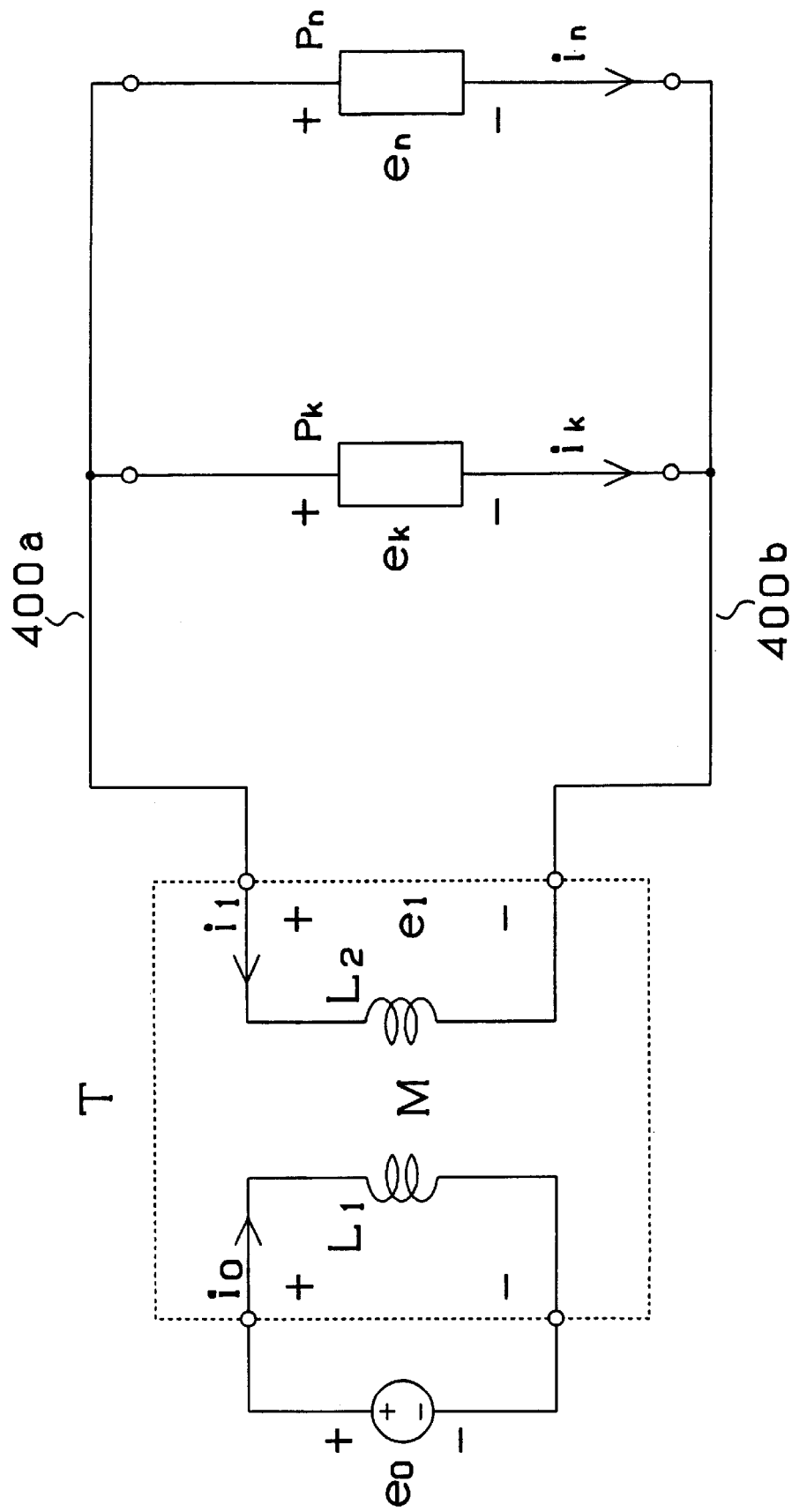
FIG. 14 is a circuit diagram illustrating a basic model of power lines with a transformer taken into consideration.

On the other hand, it is well known that various transformers, for instance ones to bring down the voltage from single phase 200 V to single phase 100 V, intervene between the power company and the building served. Therefore, demarcated by such a transformer, the circuitry is separated between the AC power lines from the power company to the primary side of the transformer and those from the secondary side of the transformer to the indoor destination. If this point is taken note of and a basic power line model including a transformer is configured, the above-mentioned basic power line model shown in FIG. 12 will take on a circuitry such as illustrated in FIG. 14. Incidentally, terminals P1, P2, Pk, Pn-1 and Pn shown in FIG. 12 are represented in FIG. 14 by terminals Pk and Pn.

Here, the electric characteristic of the transformer T can be expressed in the following equation, in which L1 is the primary side self inductance of the transformer T; L2, the secondary side self inductance of same; M, the mutual inductance of same; e0, the primary side voltage of the transformer T; e1, the secondary side voltage of same; i0, the primary side current of the transformer T; and i1, the secondary side current of the same:

$$\begin{pmatrix} e_0 \\ e_1 \end{pmatrix} = \begin{pmatrix} L_1 & M \\ M & L_2 \end{pmatrix} \begin{pmatrix} \dfrac{di_0}{dt} \\ \dfrac{di_1}{dt} \end{pmatrix}$$

The equation above reveals that the secondary voltage e1 is given as superposition of M(di0/dt) and L2(di1/dt). That is, the term of the mutual inductance M and that of the self inductance L2 determine the secondary voltage e1, i.e. the voltage indoors. Therefore, by giving an information signal to the secondary current i1, the information signal can be superposed over the secondary voltage e1 because e1=[sine wave power signal]+[information signal]. As indoor wiring uses parallel connection, the terminal voltages ek of the indoor wiring circuit are given by e1=e2=e3, . . . , ek, and accordingly communication by a power line carrier system in which power signals on the AC power lines serve as carrier and information signals are superposed on them is validated.

Next will be described the configuration of a specific configuration for giving information signals to the secondary current i1 of the transformer T, i.e. the configuration of a signal superposing apparatus 320 to which an embodiment of the present invention is applied, with reference to FIG. 11.

Figure 11:
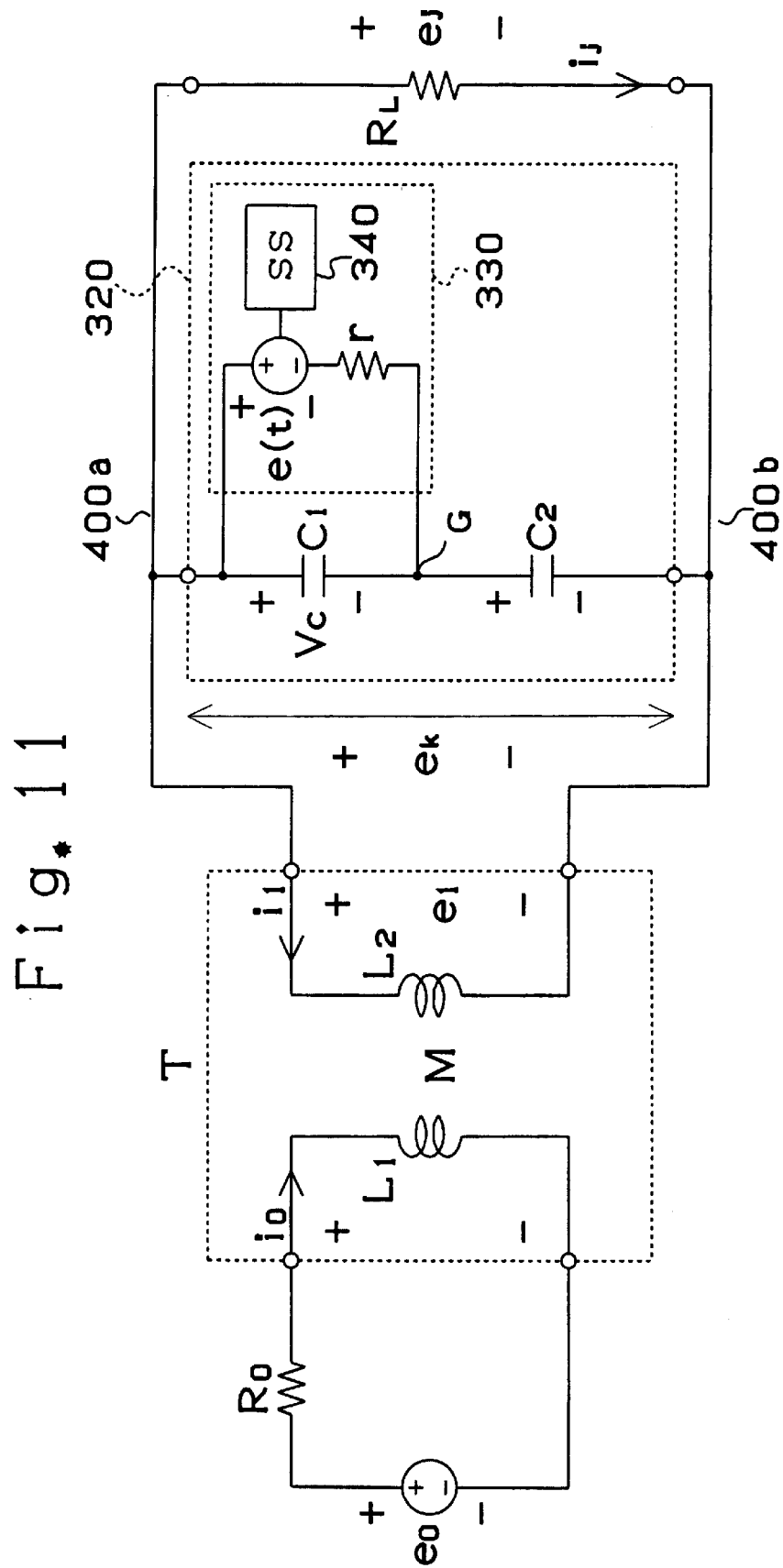
FIG. 11 is a circuit diagram illustrating a total system including a signal superposing apparatus and its peripheral units pertaining to a second preferred embodiment of the present invention.

As shown in FIG. 11, the signal superposing apparatus 320 consists of capacitors C1 and C2 and an information signal generator 330, connected in parallel between AC power lines 400a and 400b. That is, the signal superposing apparatus 320 is connected to the aforementioned terminal Pk in FIG. 14, and positioned to be electrically connected in parallel to the transformer T and other terminals Pn connected on the AC power lines 400a and 400b.

The capacitors C1 and C2 are connected in series and inserted between the AC power lines 400a and 400b. This arrangement results in the division of the terminal-to-terminal voltage ek, equal to the secondary voltage e1 of the transformer T by the capacitors C1 and C2.

Figure 20:
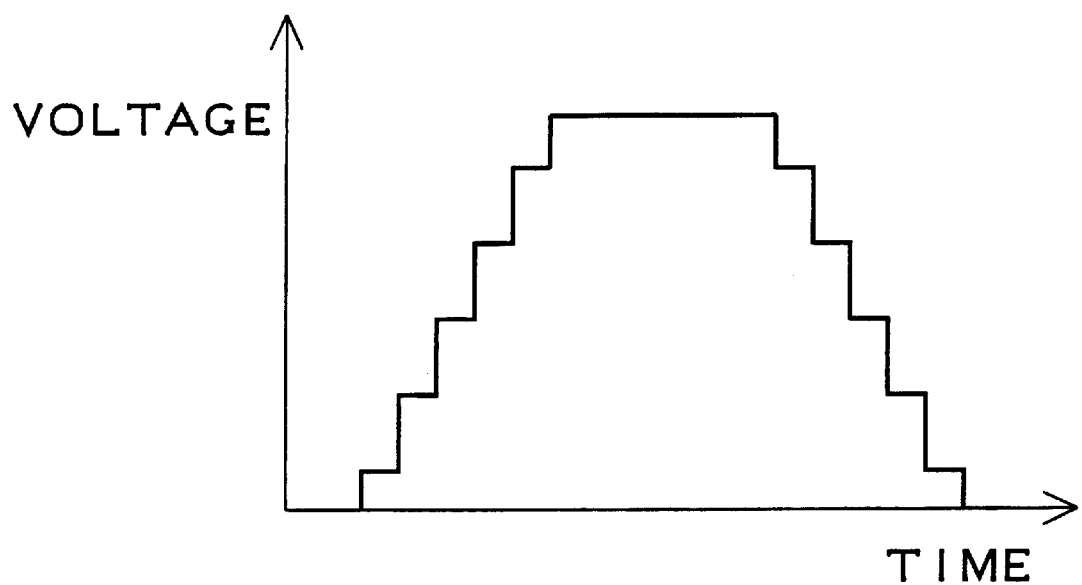
FIG. 20 is a waveform diagram illustrating an example of stepwise waveform generated by a spread spectrum apparatus.

The information signal generator 330 is connected between the point of voltage division by the capacitors C1 and C2 and the AC power line 400a, and outputs an information signal voltage e(t). This information is generated by a spread spectrum apparatus 340. For instance, a stepwise pulse waveform as shown in FIG. 20 is generated by the CDMA function of the spread spectrum apparatus 340. Incidentally, a resistor marked with sign r represents an internal resistance in the information signal generator 330, while another resistor marked with sign R0 is accountable for the impedance or the like of the power lines connected to the primary side of the transformer T. Still another resistor marked with sign RL is intended for measuring a current ij flowing between other terminals.

Thus, by connecting the capacitors C1 and C2 and the information signal generator 330, information signals e(t), which constitute a voltage source, can be injected into the secondary current i1 of the transformer T as current without having to configure a complex current source in the circuitry. In this way, the signal superposing apparatus 320 can be configured of a simple circuit, which permits injection of information signals as current into the secondary current i1 without requiring a transistor or the like.

Here, the relationships between the voltage Vc across the capacitor C1, the terminal-to-terminal voltage ek and the secondary current i1 of the transformer T can be represented by the following equations, it being assumed that C1=C2=C:

$$\frac{de_k}{dt} = \frac{-2}{CR_L}e_k - \frac{1}{Cr}Vc - \frac{2}{C}i_1 + \frac{1}{Cr}e(t)$$

$$\frac{dVc}{dt} = \frac{-1}{CR_L}e_k - \frac{1}{Cr}Vc - \frac{1}{C}i_1 + \frac{1}{Cr}e(t)$$

The above-described basic power line model involving the transformer T, as shown in FIG. 14, leads to a model formula of the circuit shown in FIG. 11 as represented by a simultaneous system of the foregoing equations and the following:

$$\begin{pmatrix} \frac{di_0}{dt} \\ \frac{di_1}{dt} \end{pmatrix} = \frac{1}{L_1L_2 - M^2}\begin{pmatrix} -M & -L_2R_0 \\ L_1 & MR_0 \end{pmatrix}\begin{pmatrix} e_k \\ i_0 \end{pmatrix} + \frac{A\sin2\pi ft}{L_1L_2 - M^2}\begin{pmatrix} L_2 \\ -M \end{pmatrix}$$

Therefore, by solving the foregoing simultaneous system of equations as a model simultaneous system of equations under practical engineering and physical conditions and put to computer simulation, waveform diagrams shown in FIGS. 16 to 19 are obtained. In the waveform diagrams of FIGS. 16 to 19, the horizontal axis is the time axis where the time count is given in the number of steps of numerical integration carried out every 0.1 μsec., and the vertical axis is the voltage axis (in V). Results of the computer simulation will be described below.

The results of the computer simulation given in FIGS. 16 to 19 were achieved by choosing the circuit constants of the capacitors C1 and C2 appropriately while giving square waves of various frequencies or periods as e(t). The waveforms of the respective (A) parts of FIGS. 16 to 19 show information signals emerging as voltage waveforms at the terminal voltage Vc of the capacitor C1, while those of the respective (B) parts of FIGS. 16 to 19 represent voltage waveforms superposed over sine wave power signals extracted out of the terminal voltages ek of terminals Pk.

Figure 16A:
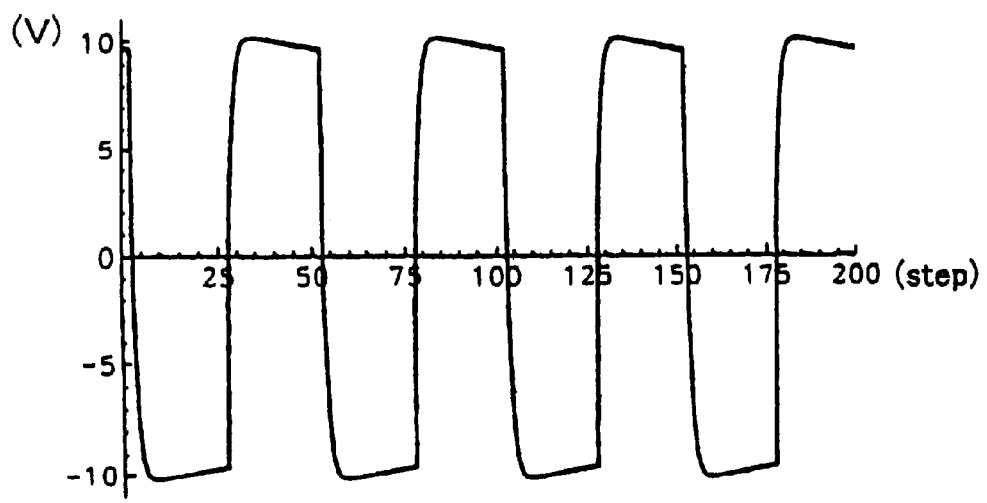
FIG. 16(A) is a waveform diagram (wherein the period of e(t) is 5 μsec.) illustrating the result of computer simulation of the circuit shown in FIG. 11, in which the waveform of a voltage VC across C1 is indicated.
Figure 16B:
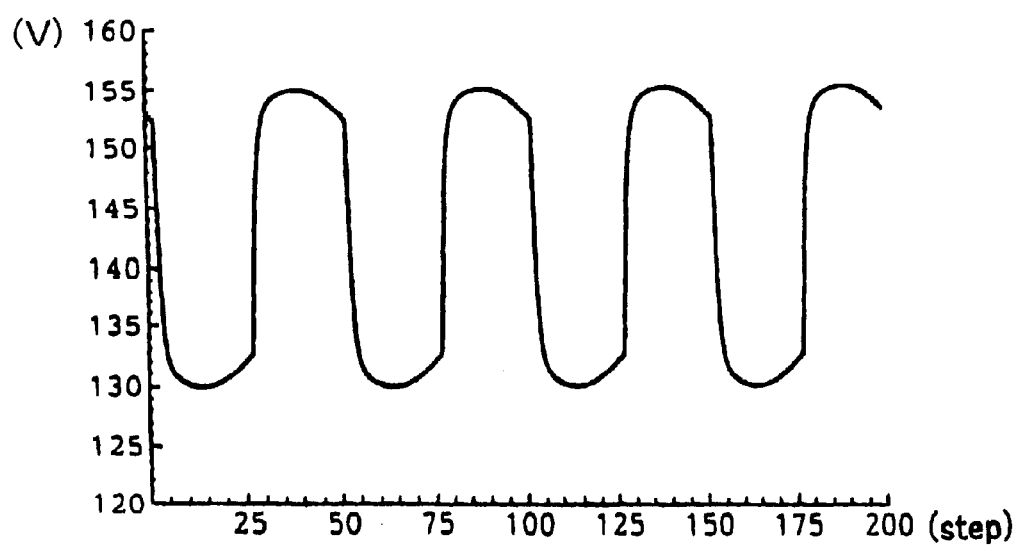
FIG. 16(B) is a waveform diagram indicating the waveform of a voltage ek across a terminal Pk.
Figure 17A:
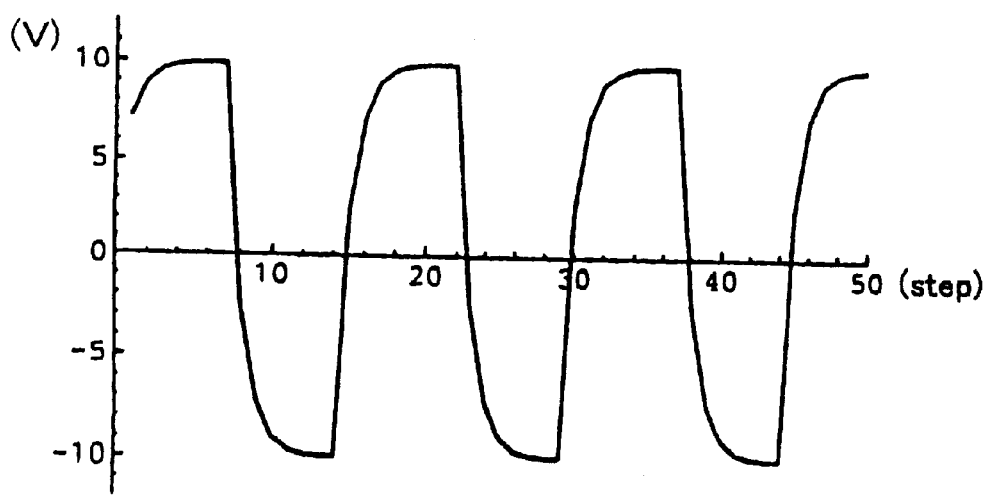
FIG. 17(A) is a waveform diagram (wherein the period of e(t) is 0.15 μsec.) illustrating the result of computer simulation of the circuit shown in FIG. 11, in which the waveform of a voltage VC across C1 is indicated.
Figure 17B:
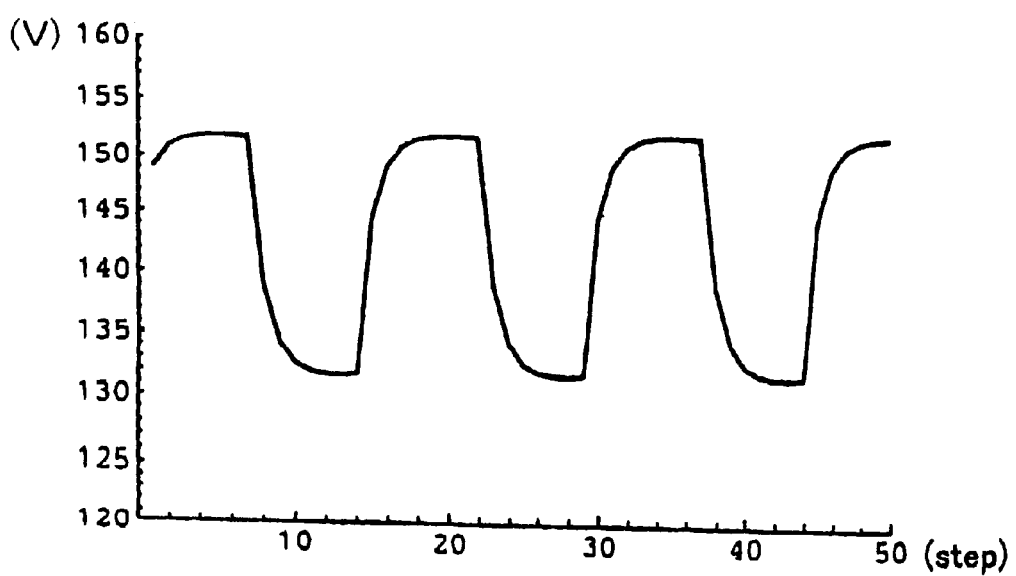
FIG. 17(B) is a waveform diagram indicating the waveform of a voltage ek across a terminal Pk.
Figure 26A:
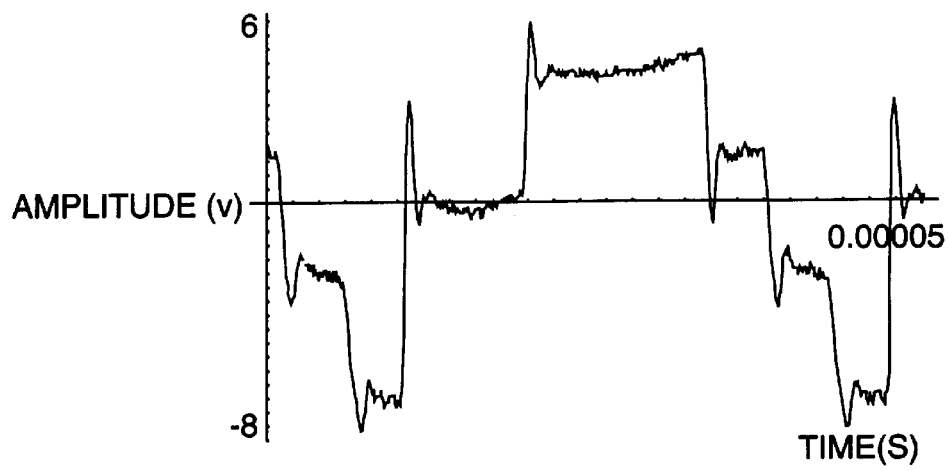
FIGS. 26(A) and 26(B) are waveform diagrams of a transmitted signal across the capacitor C1 where a signal pattern for CDMA is given.
Figure 27:
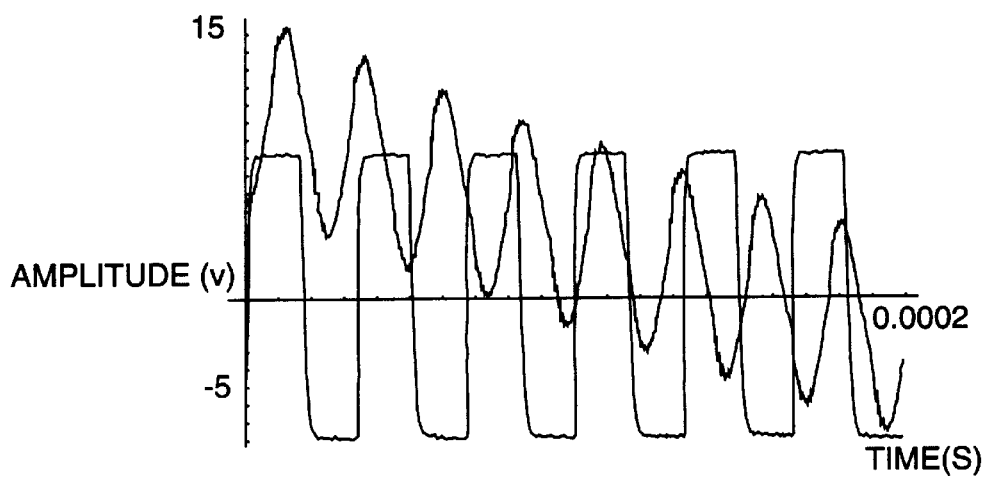
FIG. 27 is a waveform diagram illustrating the relationship between a waveform superposed over a sine wave power signal and an information signal added thereto.

FIGS. 16 and 17 illustrate the results of computer simulation of a case in which the optimal circuit constants (C1, C2) were selected, with the impedance of the transformer T taken into consideration. From these results, it is seen that the waveform given to e(t) and the superposed information waveform shown in (B) of each figure are substantially the same in shape (correlated). It is also seen that the waveform given to e(t) and the terminal voltage waveform of the capacitor C1 shown in (A) of each figure also have substantially the same shape (correlated). To take up the stepwise waveform shown in FIG. 20 as example, the signal waveform for CDMA communications information in terms of the relative level of voltage. The above-stated results reveal that information signals correlated to the pattern of the voltage level of signal waveforms for CDMA, given to e(t), can be superposed over sine wave power signals on the AC power lines 400a and 400b. These facts can also be experimentally confirmed from FIG. 27 illustrating the relationship between voltage waveforms superposed over sine wave power signals and the information signals added thereto and FIG. 26(A), (B) showing the transmitted waveform of the capacitor C1.

Figure 18A:
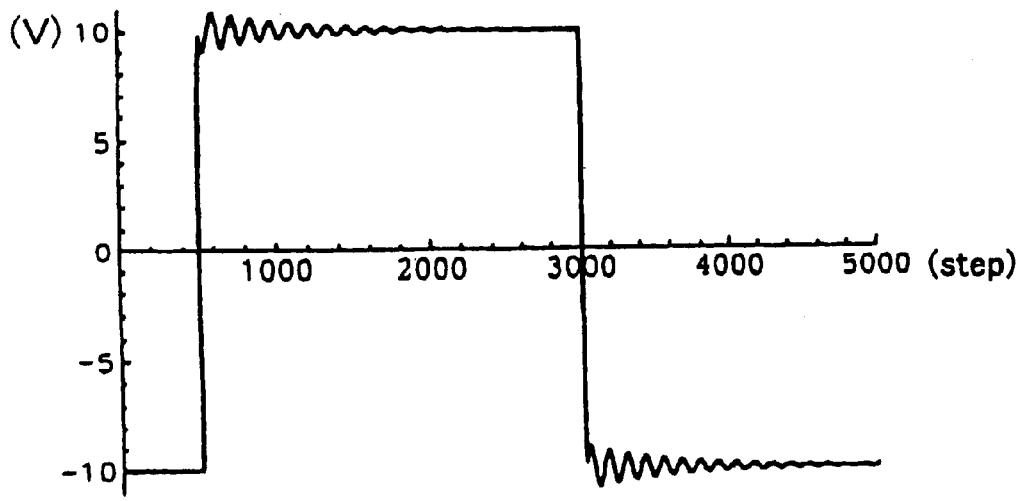
FIG. 18(A) is a waveform diagram (wherein the period of e(t) is 500 μsec.) illustrating the result of computer simulation of the circuit shown in FIG. 11, in which the waveform of a voltage VC across C1 is indicated.
Figure 18B:
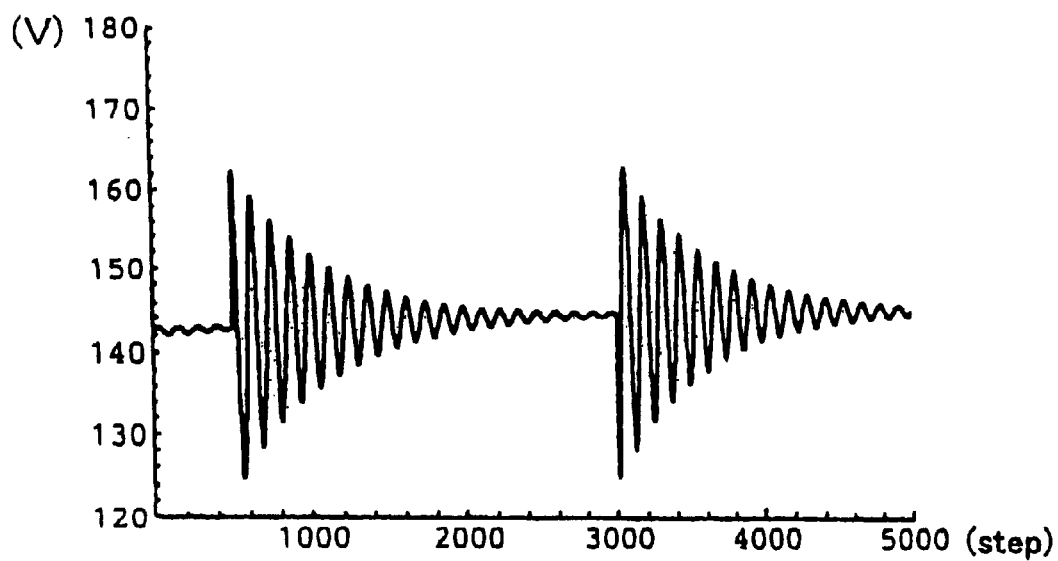
FIG. 18(B) is a waveform diagram indicating the waveform of a voltage ek across a terminal Pk
Figure 19A:
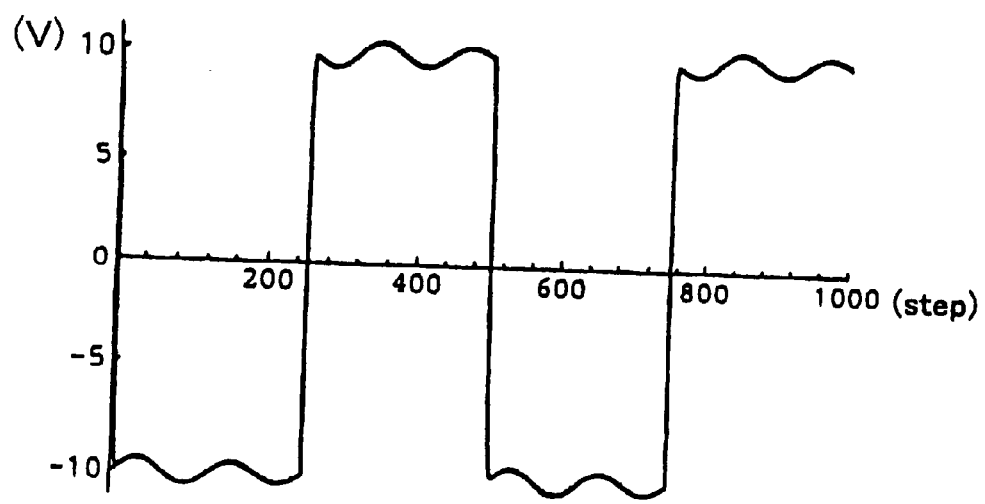
FIG. 19(A) is a waveform diagram (wherein the period of e(t) is 50 μsec.) illustrating the result of computer simulation of the circuit shown in FIG. 11, in which the waveform of a voltage VC across C1 is indicated.
Figure 19B:
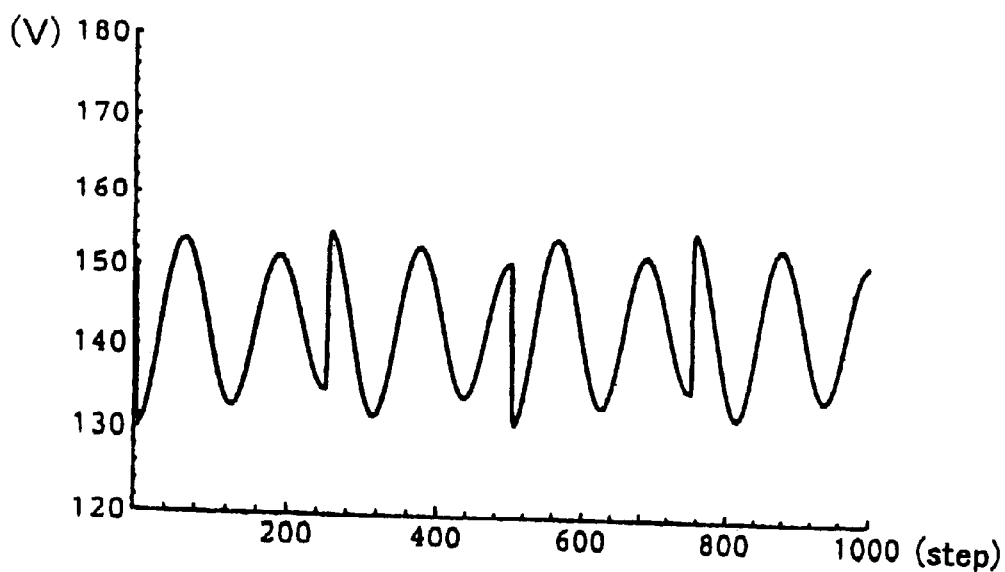
FIG. 19(B) is a waveform diagram indicating the waveform of a voltage ek across a terminal Pk.

On the other hand, FIGS. 18 and 19 illustrate the results of computer simulation in a case in which no appropriate circuit constants were selected. As comparison of the square wave of e(t) with (A) and (B) of these figures reveals, the superposed information signals are affected by the impedance of the transformer T and distorted in waveform.

Figure 15:
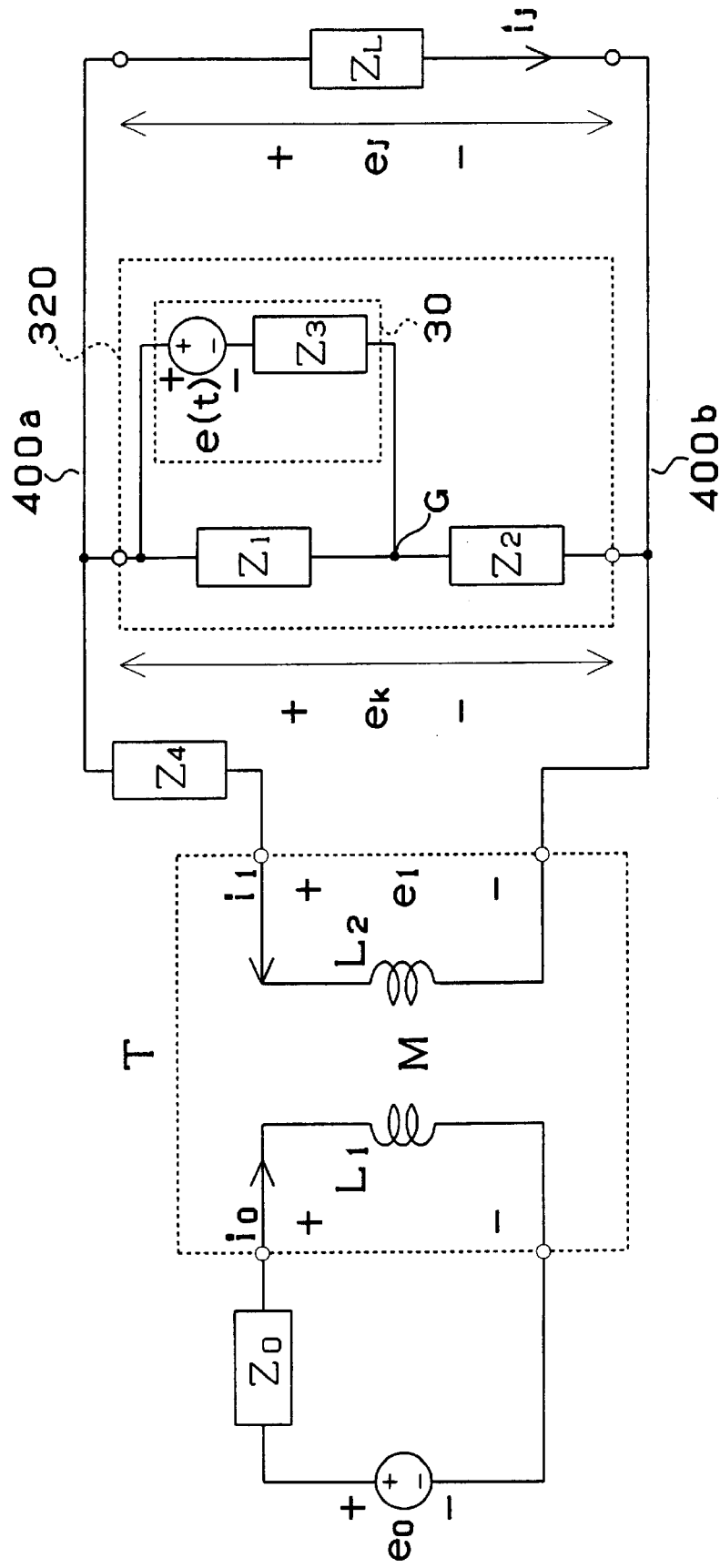
FIG. 15 is a circuit diagram illustrating a total system including a signal superposing apparatus and its peripheral units pertaining to the second preferred embodiment of the present invention as represented by an impedance model.

The total system including the basic model of the above-described signal superposing apparatus 320 and its peripheral units can be configured as well of impedances Z1 to Z3 shown in FIG. 15 instead. In this case, too, as in the foregoing instance, information signals correlated to the pattern of the voltage level of signal waveforms for CDMA, given to e(t), can be superposed over sine wave power signals on the AC power lines 400a and 400b by selecting circuit constants for the impedances Z1 to Z3 with the impedance of the transformer T taken into account.

Incidentally, the impedance Z0 shown in FIG. 15 represents an impedance including a number of transformers connected to the primary side of the transformer. An impedance Z4 is intended for adjustment of the impedance of the total system of the AC power lines 400a and 400b, and an impedance ZL, for receiving superposed information signals.

As hitherto described, if the signal superposing apparatus 320 is designed, in accordance with a basic power line model taking account of the term of the mutual inductance M and that of the self inductance L2 of the transformer T connected to the AC power lines 400a and 400b, the information signals can be superposed over power signals with the distortion of any desired waveform being kept to the minimum by selecting circuit constants so as to minimize the distortion of the information waveform by the effect of the impedance of the transformer, for instance appropriately selecting the constants of the capacitors C1 and C2. In this way, for example the stepwise pulse waveform, as illustrated in FIG. 20, can be superposed over power signals with the distortion of waveform being minimized, and accordingly there is achieved the effect to make possible CDMA in a power line carrier system whereby information signals are communicated with power signals on AC power lines being used as carrier wave.

Figure 21:
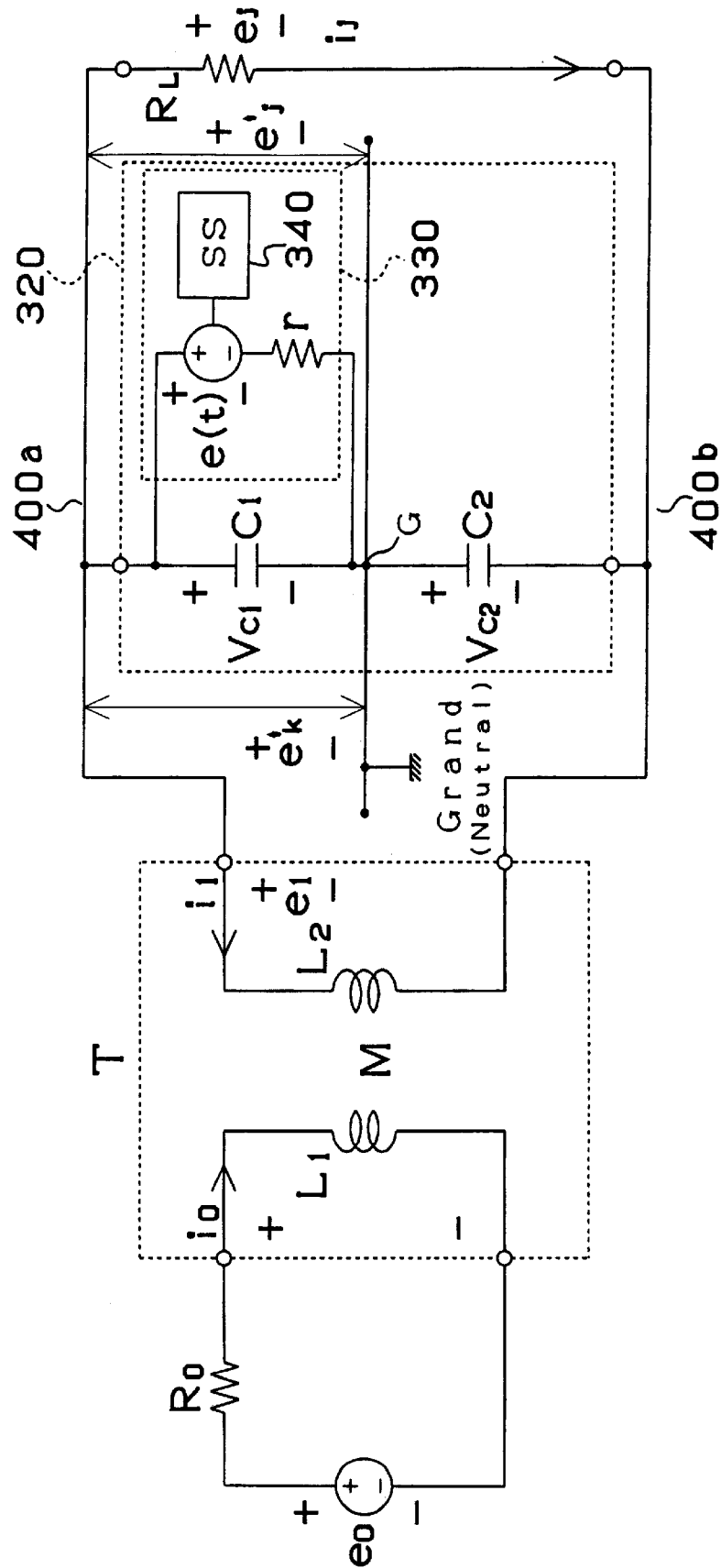
FIG. 21 is a circuit diagram illustrating a modified example of total system including a signal superposing apparatus and its peripheral units pertaining to the second preferred embodiment of the invention.
Figure 24A:
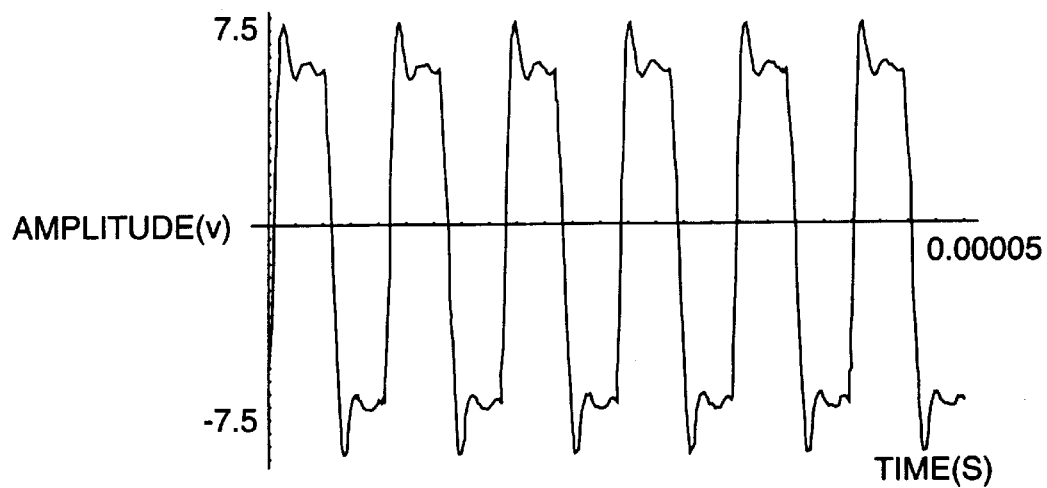
FIG. 24(A) is a waveform diagram of a voltage fed to the capacitor C1 of the signal superposing apparatus illustrated in FIG. 21.
Figure 24B:
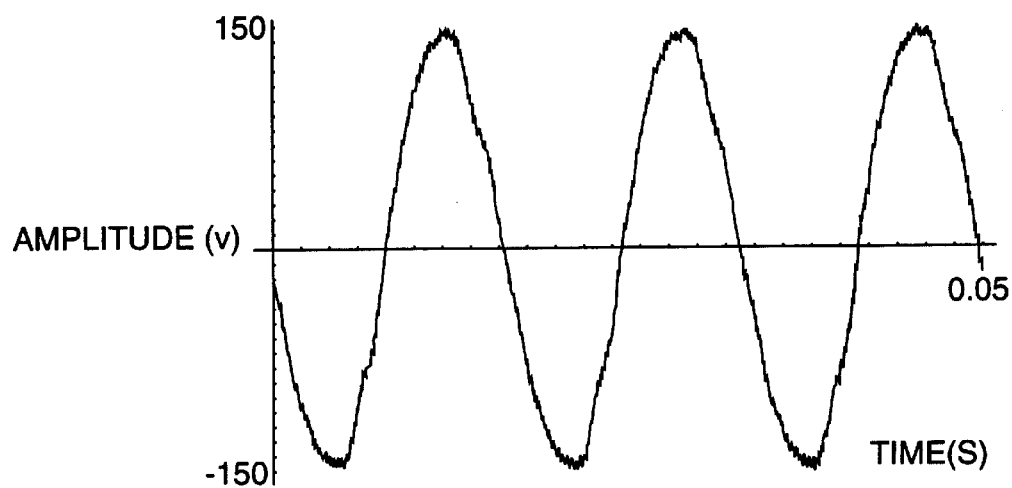
FIG. 24(B) is a waveform diagram of a capacitor C2.

FIG. 21 illustrates an instance in which the configuration of the second embodiment is applied to three-terminal power lines (one terminal is grounded, i.e. neutral). In this diagram, e'K denotes the voltage between the ground and the terminal on the indoor wiring 400a side. Between the terminals of the capacitor C1 in FIG. 11, the source e(t) and the resistor r are connected in series, but in this case of FIG. 21, they are connected in parallel, and accordingly it is obvious that, because of Kirchhoff's law, the voltage waveform Vc1 between the connecting point G of the capacitors C1 and C2 and the AC power line 400a on the capacitor C1 side becomes the voltage waveform (supposed to be Ve+r) itself resulting from the addition of the voltage source e(t) and the voltage of the resistor r, and the voltage waveform Vc2 between the AC power line 400b on the capacitor C2 side and the connecting point G is a waveform resulting from the subtraction of Ve+r from the waveform A sin2πft+H(f), consisting of a signal waveform superposed over an AC sine waveform, i.e. Vc2=A sin2πft+H(f)−(Ve+r). This can also be experimentally confirmed from FIG. 24(A) illustrating the waveform of the capacitor C1 and FIG. 24(B) showing the waveform of the capacitor C2.

Figure 26B:
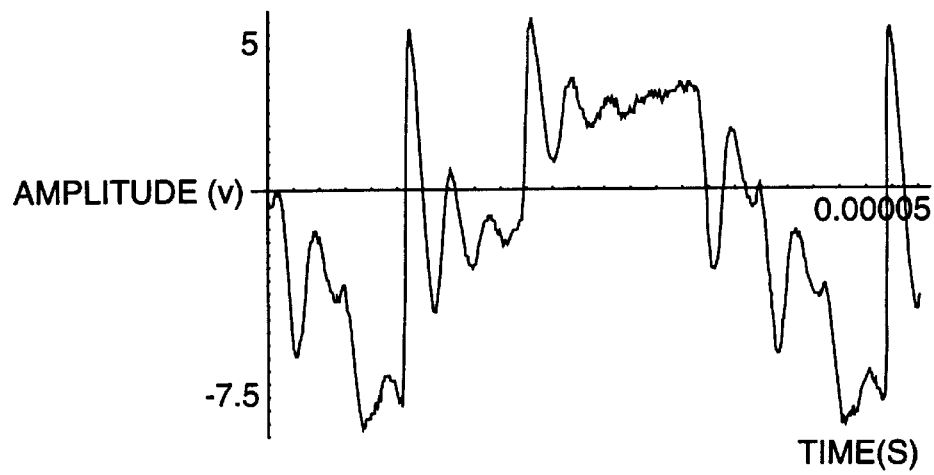

As is seen from FIGS. 16(A) and 17(A), the square waveform given to e(t) and the terminal voltage waveform of the capacitor C1 shown in (A) of each figure have substantially the same shape (are correlated). The voltage waveforms of the AC power line 400a on the capacitor C1 side and of the connection point G indicate that, since the voltage source e(t) is inserted between the terminals of the capacitor C1, information signals of the waveform pattern of e(t) for CDMA can be superposed between the terminals of C1 on the time axis, with the characteristics of the pattern hardly affected, if the optimal circuit constants (C1, C2) are selected with the impedance of the transformer T taken into consideration. FIG. 26(A) and 26(B) show the results of an experiment in which the signal pattern for CDMA of FIG. 23(A) was given to e(t). Thus it was also experimentally confirmed that the signal pattern for CDMA could be superposed between the terminals of C1 without losing the characteristics of the signal pattern, if the optimal circuit constants (C1, C2) are selected with the impedance of the transformer T taken into consideration.

Figure 22:
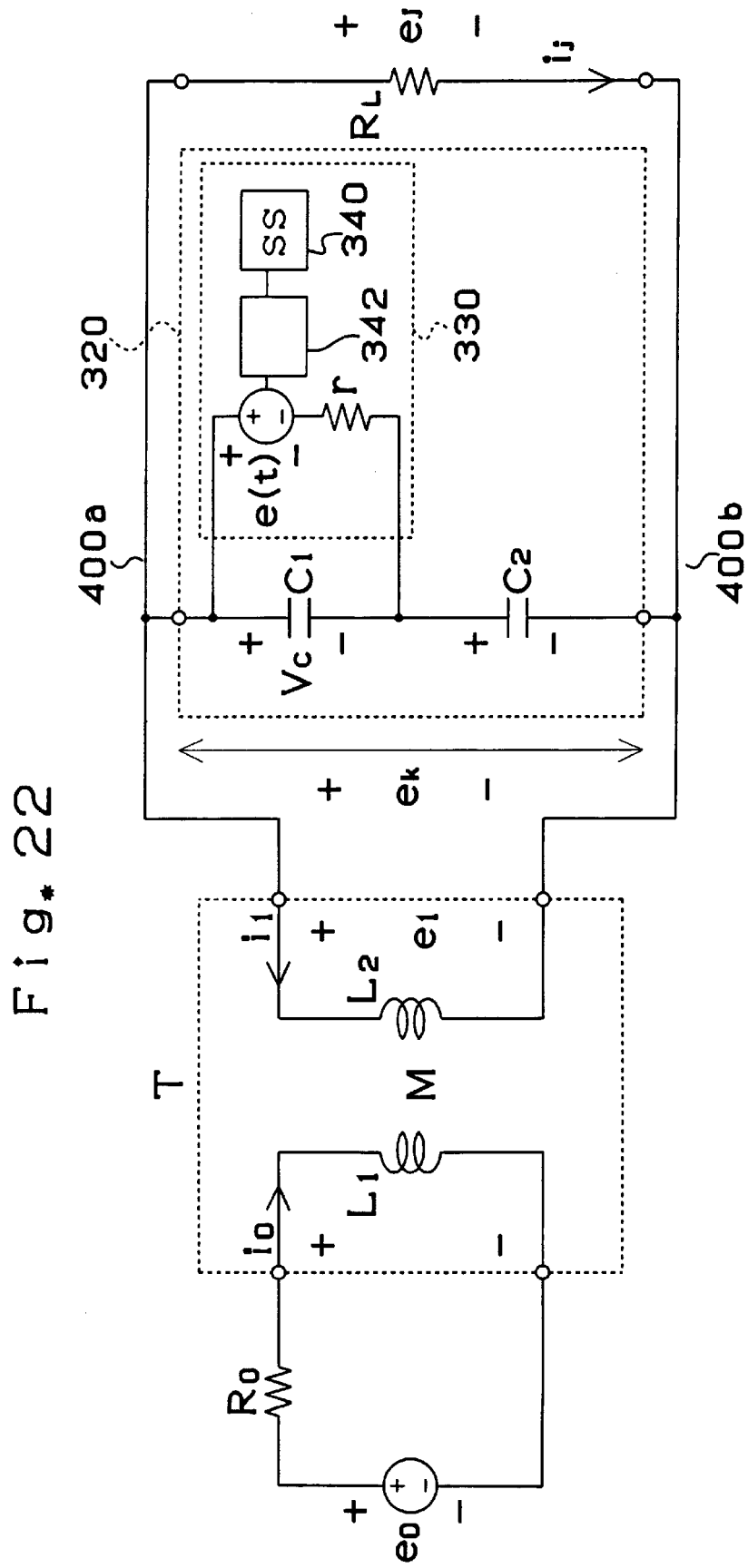
FIG. 22 is a circuit diagram illustrating another modified example of the total system including a signal superposing apparatus and its peripheral units pertaining to the second preferred embodiment of the invention.
Figure 23A:
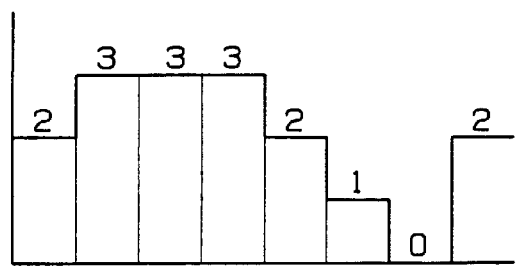
FIG. 23(A) is a waveform diagram illustrating an input to a level converter.
Figure 23B:
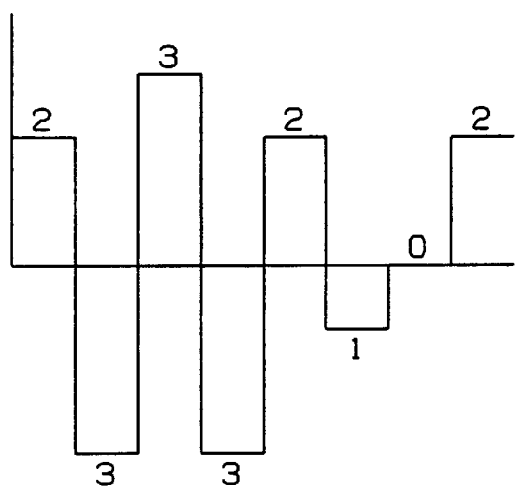
FIGS. 23(B) and 23(C) are waveform diagrams illustrating outputs of the level converter.
Figure 23C:
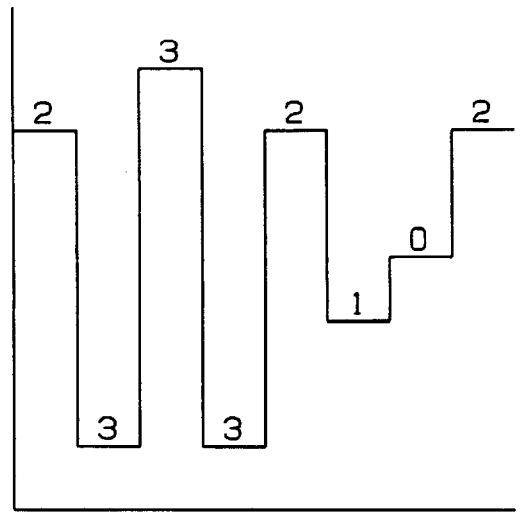

FIG. 22 illustrates an alternative circuit of the second embodiment shown in FIG. 11. In this signal superposing apparatus, a level converter 342 is connected to the output of the spread spectrum unit 340. That is, if it is attempted to superpose CDMA generated by the spread spectrum unit 340 shown in FIG. 23(A) as it is over power lines, the waveform may be distorted during communication, making CDMA generation difficult. In view of this possible difficulty, as shown in FIG. 23(B), the waveform of CDMA is taken as level in the level converter 342, and level signals representing level differences assigned to a positive and a negative sides are generated. Thus, when the waveform level of CDMA corresponds to "2" in FIG. 23(A), a level signal of "2" is generated as shown in FIG. 23(B), and when the waveform level of CDMA corresponds to "3", a level signal of "3" is generated on the negative side. Here, in FIG. 23(C), as the level signals are on the negative side, it is possible to convert them into level variations on the positive side as shown in FIG. 23(A), and conversion into signals of diverse other level variations is also possible.

Figure 25:
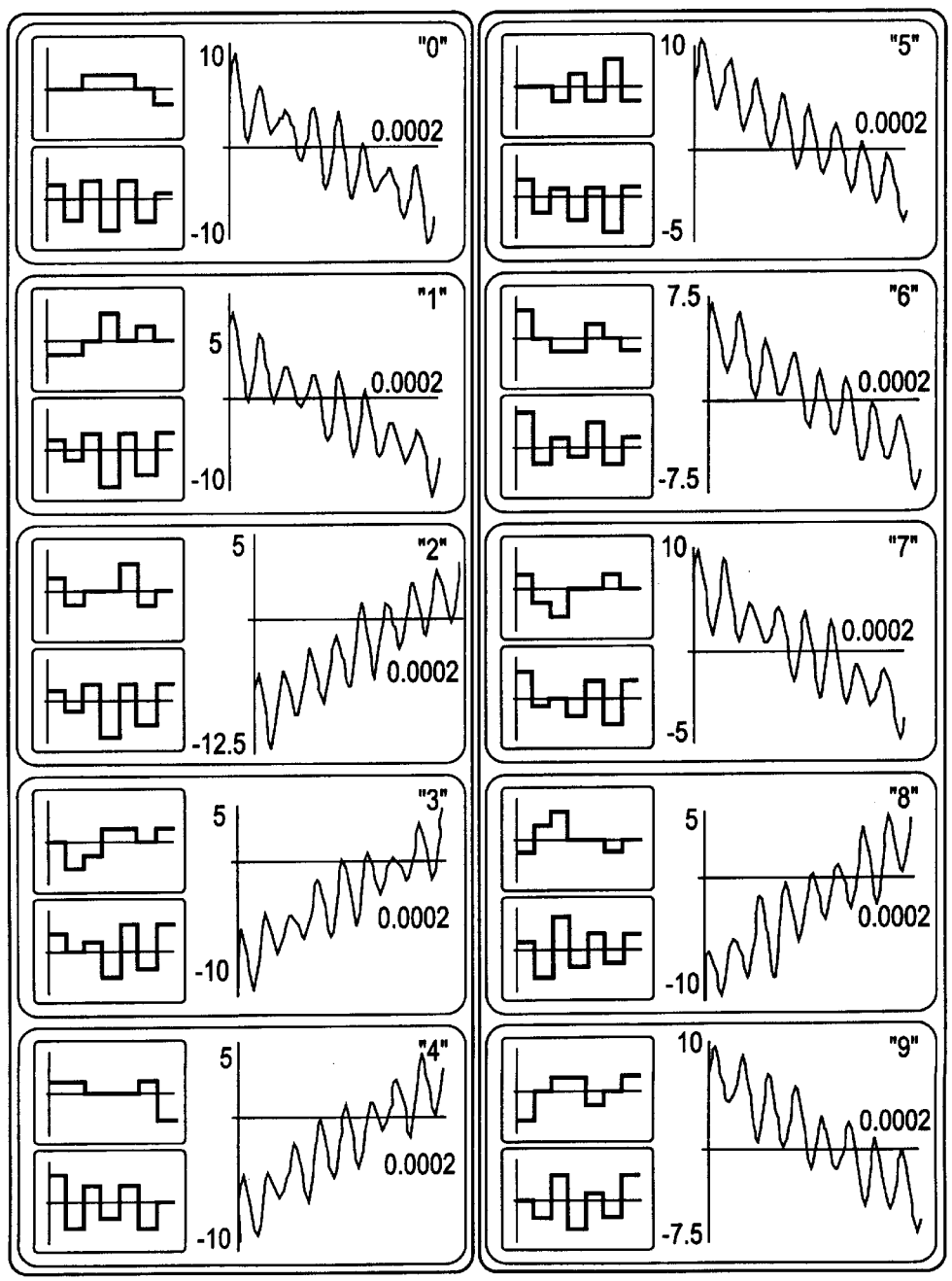
FIG. 25 is a diagram illustrating a channel multiplex signal pattern where a diffusion cord on a 30 m long indoor power line is used.

FIG. 25 illustrates a channel multiplex signal pattern where a diffusion cord on a 30 m long indoor power line is used. It has been experimentally confirmed that, where the level signals are used, superimposition is possible without affecting the characteristics of the pattern of the level signals.

Since the configuration of the second embodiment has circuit elements obtained by using the self inductances and mutual inductance of the transformer connected to the AC power line, the circuit configuration takes account of the waveform distortion of information signals attributable to the transformer connected to the AC power lines. As a result, the circuit can be so configured as to minimize the waveform distortion of the superposed information signals by appropriately choosing the circuit elements with due consideration for the impedance of the transformer. Therefore, as it is possible to minimize the waveform distortion of the superposed information signals, there is achieved an effect to make possible superposition of information signals of a desired waveform over power signals on AC power lines.

In the configuration of the second embodiment, such circuit elements are impedances Z1 and Z2 for dividing the power signal voltage and a voltage source connected to this voltage division point. This arrangement enables information signals to be injected into the divided electric signal voltages provided by the impedances Z1 and Z2 obtained by using the self inductances and mutual inductance of the transformer. Therefore, the circuit can be so configured as to minimize the waveform distortion of information signals by appropriately selecting the impedances Z1 and Z2 with the impedance of the transformer taken into consideration, resulting in the effect that information signals of a desired waveform can be superposed over power signals on AC power lines.

Since the impedances Z1 and Z2 consist of capacitors in the configuration of the second embodiment, even if information signals are supplied as voltages, these capacitors can convert these information signals into current signals. As a result, there is another effect that, even if information signals are generated from the voltage source as voltages, they can be converted into current with a simple circuitry, and moreover they can be superposed over power signals as current signals.

As the voltage source has a CDMA function in the configuration of the second embodiment, information signals generated from the voltage source are multiplexed in a CDMA manner. This provides still another effect of enabling information signals to be multiplexed in a spread spectrum communication system to be transmitted in a power line carrier system in which the information signals are superposed over a carrier wave consisting of power signals on AC power lines.

In the configuration of the second embodiment, where the secondary voltage e1 of the transformer can be expressed in a formula involving a term of M(di0/dt) and a term of L2(di1/dt), information signals are given to the secondary current i1 of the transformer. That is, since the information signals are given to the secondary current i1 of the transformer, with a secondary self inductance L2 and mutual inductance M being taken into account, the waveform distortion of the information signals can be kept to the minimum by injecting the information signals, with circuit constants appropriately selected not to let the impedance of the transformer cause the phase and other factors to vary. Accordingly, there is yet another effect to make possible superposition of information signals of a desired waveform over power signals on AC power lines.

What is claimed is:

1. An arrangement for communicating information signals over a power line carrier, comprising:

a filter for extracting from a carrier signal upon which information signals have been superposed, a waveform indicative of a power line carrier without information signals superposed thereon to provide an extracted carrier signal;

a phase shifting means for phase shifting said extracted carrier signal to provide a phase shifted extracted carrier signal;

a phase converting means for generating a phase converted carrier signal being indicative of the carrier signal before having information signals superposed thereon, wherein said extracted carrier signal is added to said phase shifted extracted carrier signal by said phase converting means to provide said phase converted carrier signal; and a subtracting means for extracting the information signals by subtracting said phase converted carrier signal from said carrier signal upon which said information signals have been superposed.

2. The arrangement as claimed in claim 1, wherein said phase shifting means comprises one of a differentiating circuit and an integrating circuit.

3. A method for extracting communications information signals superposed over a power line carrier, comprising:

using a filter to extract from a carrier signal upon which information signals have been superposed, a waveform indicative of a power line carrier without information signals superposed thereon to provide an extracted carrier signal;

phase shifting said extracted carrier signal to provide a phase shifted extracted carrier signal;

generating a phase converted carrier signal being indicative of the carrier signal before having information signals superposed thereon, wherein said extracted carrier signal is added to said phase shifted extracted carrier signal by a phase converting means to provide said phase converted carrier signal; and extracting the information signals by subtracting said phase converted carrier signal from said carrier signal upon which said information signals have been superposed.

4. A method for transmitting information signals over a carrier wave on AC power lines, comprising:

injecting information signals into a secondary side current i1 of a transformer, of which a primary side voltage e0 is represented by an expression including a term of L1 (di0/dt) and a term of M(di1/dt), and a secondary side voltage e1 is represented by an expression including a term of M(di0/dt) and a term of L2 (di1/dt), wherein L1 is a primary side self inductance of said transformer connected to the AC power lines; L2, a secondary side self inductance of said transformer; M, a mutual inductance of said transformer; e0, said primary side voltage of said transformer; e1, said secondary side voltage of said transformer; i0, said primary side current of said transformer; and i1, said secondary side current of said transformer.

5. An arrangement for transmitting communications information signals over a carrier wave on AC power lines, comprising:

a power transformer having a primary side self inductance connected to the AC power lines, and a secondary side inductance; and a signal superposing device which infects information signals into a current flowing into said secondary side inductance of said power transformer, wherein said signal superposing device comprises:

an information signal generator which outputs an information signal voltage, said information signal generator being connected in parallel to said power transformer; and circuit elements whose circuit constants are selected to minimize self-inductance and mutual inductance impedance effects of said power transformer.

6. The arrangement as claimed in claim 5, wherein said circuit elements comprise:

an impedance Z1 and an impedance Z2 connected in series between said AC power lines so as to divide a power signal voltage equal to a voltage across the secondary inductance side of said transformer; and a voltage source connected between a point of voltage division by said impedances Z1 and Z2 and one of said AC power lines to produce said information signals.

7. The arrangement as claimed in claim 6, wherein said impedance Z1 and impedance Z2 are constituted by capacitors.

8. The arrangement as claimed in claim 5, wherein said signal superposing means further comprises a level converter for converting the waveform of CDMA signals superposed as information signals into signals of level variation.

9. The arrangement according to claim 5, further comprising:

a spread spectrum means for generating a code division multiple access (CDMA) function for said information signal voltage.

10. The arrangement according to claim 5, wherein the AC power lines are three-terminal power lines having a neutral terminal.

11. The arrangement according to claim 10, wherein a connecting point G connects a capacitor C1 constituting an impedance Z1 and a capacitor C2 constituting an impedance Z2, said connecting point G being grounded at said neutral terminal of said three terminal power lines.

* * * * *